(12) United States Patent  
Ramasastry et al.

(10) Patent No.: US 7,522,774 B2  
(45) Date of Patent: Apr. 21, 2009

(54) METHODS AND APPARATUSES FOR COMPRESSING DIGITAL IMAGE DATA

(75) Inventors: Jayaram Ramasastry, Woodinville, CA (US); Partho Choudhury, Maharashtra (IN); Ramesh Prasad, Maharashtra (IN)

(73) Assignee: Sindhara Supermedia, Inc., Redmond, WA (US)

( * ) Notice: Subject to any disclaimer, the term of this patent is extended or adjusted under 35 U.S.C. 154(b) by 607 days.

(21) Appl. No.: 11/077,106

(22) Filed: Mar. 9, 2005

(65) Prior Publication Data

US 2005/0207664 A1 Sep. 22, 2005

Related U.S. Application Data

(60) Provisional application No. 60/552,153, filed on Mar. 10, 2004, provisional application No. 60/552,356, filed on Mar. 10, 2004, provisional application No. 60/552,270, filed on Mar. 10, 2004.

(51) Int. Cl.  
 *G06K 9/36* (2006.01)

(52) U.S. Cl. .................................................... 382/232

(58) Field of Classification Search ................ 382/232, 382/239, 240, 248; 708/317, 400–401; 375/240, 375/240.01, 240.02, 240.11, 240.18, 240.19; 348/384.1, 398.1, 404.1  
See application file for complete search history.

(56) References Cited

U.S. PATENT DOCUMENTS

| | | | | | |
|---|---|---|---|---|---|
| 5,585,852 | A | * | 12/1996 | Agarwal | 375/240.11 |
| 5,881,176 | A | * | 3/1999 | Keith et al. | 382/248 |
| 6,967,600 | B2 | * | 11/2005 | Kadono et al. | 341/67 |
| 7,295,608 | B2 | * | 11/2007 | Reynolds et al. | 375/240.01 |
| 7,333,814 | B2 | * | 2/2008 | Roberts | 455/452.2 |

* cited by examiner

*Primary Examiner*—Jose L Couso  
(74) *Attorney, Agent, or Firm*—Blakely, Sokoloff, Taylor & Zafman LLP

(57) ABSTRACT

Methods and apparatuses for compressing digital image data are described herein. In one embodiment, a wavelet transform is performed on each pixel of a frame to generate multiple wavelet coefficients representing each pixel in a frequency domain. The wavelet coefficients of a sub-band of the frame are iteratively encoded into a bit stream based on a target transmission rate, where the sub-band of the frame is obtained from a parent sub-band of a previous iteration. The encoded wavelet coefficients satisfy a predetermined threshold based on a predetermined algorithm while the wavelet coefficients that do not satisfy the predetermined threshold are ignored in the respective iteration. Other methods and apparatuses are also described.

30 Claims, 18 Drawing Sheets

Integer Motion Prediction

Half-Pel Motion Prediction

Integer Motion Prediction

Half-Pel Motion Prediction

→ Motion Vector (Identical colors denote MVs of the same block)

--> Displaced MV to translate matching block to the relative position of macroblock currently being tested OBMC when current block being tested is in 4MV mode

METHODS AND APPARATUSES FOR COMPRESSING DIGITAL IMAGE DATA

This application claims the benefit of U.S. Provisional Application No. 60/552,153, filed Mar. 10, 2004, U.S. Provisional Application No. 60/552,356, filed Mar. 10, 2004, and U.S. Provisional Application No. 60/552,270, filed Mar. 10, 2004. The above-identified applications are hereby incorporated by reference in their entirety.

FIELD OF THE INVENTION

The present invention relates generally to multimedia applications. More particularly, this invention relates to compressing digital image data.

BACKGROUND OF THE INVENTION

A variety of systems have been developed for the encoding and decoding of audio/video data for transmission over wire-line and/or wireless communication systems over the past decade. Most systems in this category employ standard compression/transmission techniques, such as, for example, the ITU-T Rec. H.264 (also referred to as H.264) and ISO/IEC Rec. 14496-10 AVC (also referred to as MPEG-4) standards. However, due to their inherent generality, they lack the specific qualities needed for seamless implementation on low power, low complexity systems (such as hand held devices including, but not restricted to, personal digital assistants and smart phones) over noisy, low bit rate wireless channels.

Due to the likely business models rapidly emerging in the wireless market, in which cost incurred by the consumer is directly proportional to the actual volume of transmitted data, and also due to the limited bandwidth, processing capability, storage capacity and battery power, efficiency and speed in compression of audio/video data to be transmitted is a major factor in the eventual success of any such multimedia content delivery system. Most systems in use today are retrofitted versions of identical systems used on higher end desktop workstations. Unlike desktop systems, where error control is not a critical issue due to the inherent reliability of cable LAN/WAN data transmission, and bandwidth may be assumed to be almost unlimited, transmission over limited capacity wireless networks require integration of such systems that may leverage suitable processing and error-control technologies to achieve the level of fidelity expected of a commercially viable multimedia compression and transmission system.

Conventional video compression engines, or codecs, can be broadly classified into two broad categories. One class of coding strategies, known as a download-and-play (D&P) profile, not only requires the entire file to be downloaded onto the local memory before playback, leading to a large latency time (depending on the available bandwidth and the actual file size), but also makes stringent demands on the amount of buffer memory to be made available for the downloaded payload. Even with the more sophisticated streaming profile, the current physical limitations on current generation transmission equipment at the physical layer force service providers to incorporate a pseudo-streaming capability, which requires an initial period of latency (at the beginning of transmission), and continuous buffering henceforth, which imposes a strain on the limited processing capabilities of the hand-held processor. Most commercial compression solutions in the market today do not possess a progressive transmission capability, which means that transmission is possible only until the last integral frame, packet or bit before bandwidth drops below the minimum threshold. In case of video codecs, if the connection breaks before the transmission of the current frame, this frame is lost forever.

Another drawback in conventional video compression codes is the introduction of blocking artifacts due to the block-based coding schemes used in most codecs. Apart from the degradation in subjective visual quality, such systems suffer from poor performance due to bottlenecks introduced by the additional de-blocking filters. Yet another drawback is that, due to the limitations in the word size of the computing platform, the coded coefficients are truncated to an approximate value. This is especially prominent along object boundaries, where Gibbs' phenomenon leads to the generation of a visual phenomenon known as mosquito noise. Due to this, the blurring along the object boundaries becomes more prominent, leading to degradation in overall frame quality.

Additionally, the local nature of motion prediction in some codes introduces motion-induced artifacts, which cannot be easily smoothened by a simple filtering operation. Such problems arise especially in cases of fast motion clips and systems where the frame rate is below that of natural video (e.g., 25 or 30 fps non-interlaced video). In either case, the temporal redundancy between two consecutive frames is extremely low (since much of the motion is lost in between the frames itself), leading to poorer tracking of the motion across frames. This effect is cumulative in nature, especially for a longer group of frames (GoF).

Furthermore, mobile end-user devices are constrained by low processing power and storage capacity. Due to the limitations on the silicon footprint, most mobile and hand-held systems in the market have to time-share the resources of the central processing unit (microcontroller or RISC/CISC processor) to perform all its DSP, control and communication tasks, with little or no provisions for a dedicated processor to take the video/audio processing load off the central processor. Moreover, most general-purpose central processors lack the unique architecture needed for optimal DSP performance. Therefore, a mobile video-codec design must have minimal client-end complexity while maintaining consistency on the efficiency and robustness front.

SUMMARY OF THE INVENTION

Methods and apparatuses for compressing digital image data are described herein. In one embodiment, a wavelet transform is performed on each pixel of a frame to generate multiple wavelet coefficients representing each pixel in a frequency domain. The wavelet coefficients of a sub-band of the frame are iteratively encoded into a bit stream based on a target transmission rate, where the sub-band of the frame is obtained from a parent sub-band of a previous iteration. The encoded wavelet coefficients satisfy a predetermined threshold based on a predetermined algorithm while the wavelet coefficients that do not satisfy the predetermined threshold are ignored in the respective iteration.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
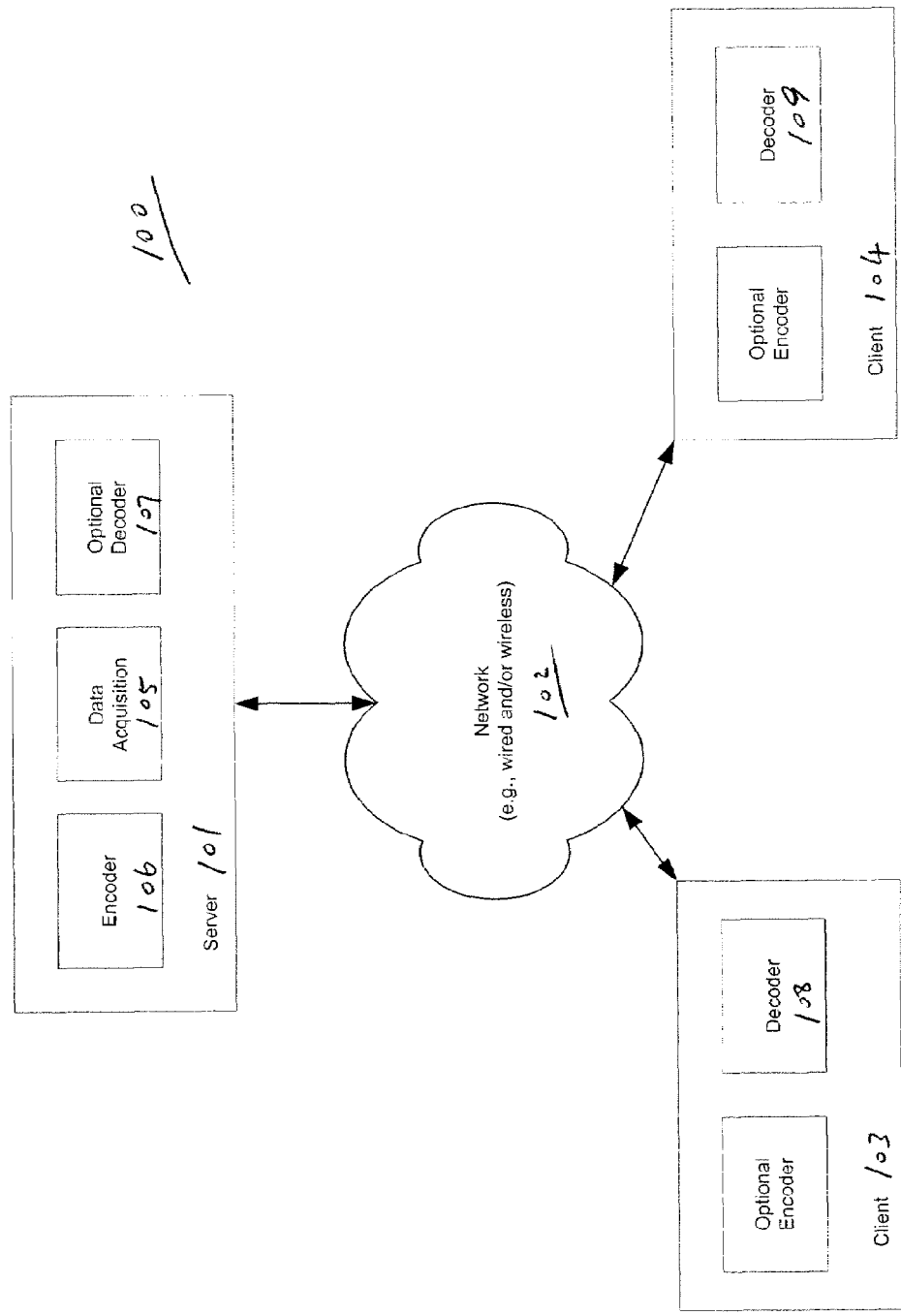
FIG. 1 is a block diagram illustrating an exemplary multimedia streaming system according to one embodiment.

Methods and apparatuses for compressing digital image data are described herein. Concerns addressed by embodiments in this application are the speed of processing data using a processor having limited processing power, storage memory capacity and/or battery life, to achieve transmission data rates which would reproduce high-fidelity multimedia data (e.g., audio/video), the optimal compression of the payload data by exploiting any form of redundancy (e.g., spatial, temporal or run-length) present therein to achieve a target transmission rate as specified by the channel capacity, and the packetization of the data for optimal progressive transmission over the channel.

Embodiments of the system are suited for wireless streaming solutions, due to the seamless progressive transmission capability (e.g., various bandwidths), which help in graceful degradation of video quality in the event of a sudden shortfall in channel bandwidth. Moreover, it also allows for comprehensive intra- as well as inter-frame rate control, thereby allowing for the optimal allocation of bits to each frame, and an optimal distribution of the frame bit budget between the luma and chroma maps. As a result, this helps in improving the perspective quality of frames that have relatively high levels of detail or motion, while maintaining a minimal threshold on the picture quality of uniform texture and/or slow motion sequences within a video clip.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Overview

Embodiments set forth herein include a stable system to compress and decompress digital audio/video data that is implemented on software and/or hardware platforms. Some advantages of the various embodiments of the invention include, but are not limited to, low battery power consumption, low complexity and low processing load, leading to a more efficient implementation of a commercial audio/video compression/decompression and transmission system.

According to certain embodiments, some other advantages include, but are not restricted to, a robust error detection and correction routine that exploits the redundancies in the unique data structure used in the source/arithmetic encoder/decoder of the system, and a smaller search space for predicting motion between two consecutive frames, for a more efficient and faster motion prediction routine.

Figure 3:
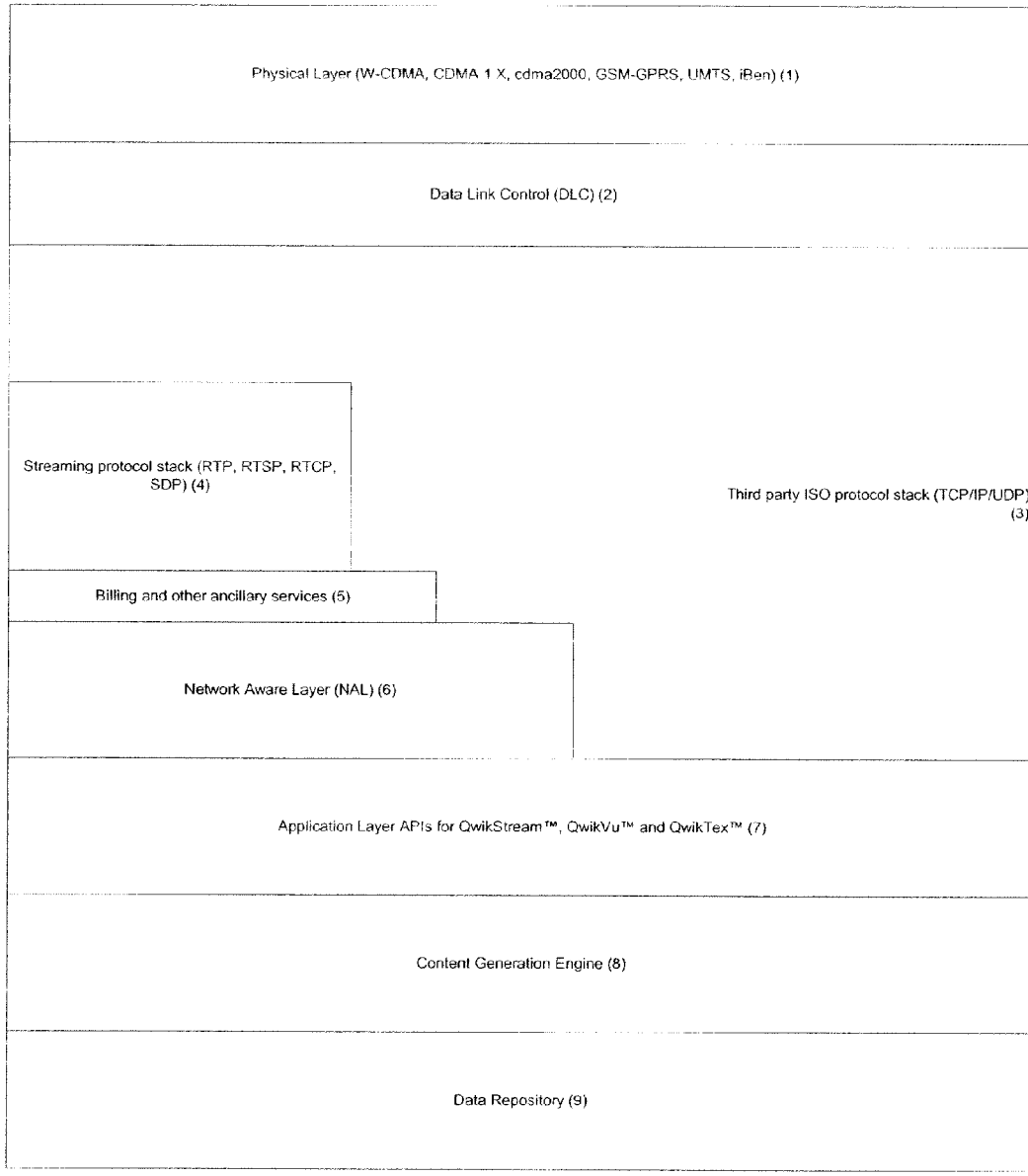
FIG. 3 is a block diagram illustrating an exemplary network stack according to one embodiment.

FIG. 1 is a block diagram of one embodiment of an exemplary multimedia streaming system. Referring to FIG. 1, exemplary system 100 includes server component 101 (also referred to herein as a server suite) communicatively coupled to client components 103-104 (also referred to herein as client suites) over a network 102, which may be a wired network, a wireless network, or a combination of both. A server suite is an amalgamation of several services that provide download-and-playback (D&P), streaming broadcast, and/or peer-to-peer communication services. This server suite is designed to communicate with any third party network protocol stack (as shown in FIG. 3). In one embodiment, these components of the system may be implemented in the central server, though a lightweight version of the encoder may be incorporated into a handheld platform for peer-to-peer video conferencing applications. The decoder may be implemented in a client-side memory. The server component 101 may be implemented as a plug-in application within a server, such as a Web server. Similarly, each of the client components 103-104 may be implemented as a plug-in within a client, such as a wireless station (e.g., cellular phone, a personal digital assistant or PDA).

In one embodiment, server component 101 includes a data acquisition module 105, an encoder 106, and a decoder 107. The data acquisition module 105 includes a video/audio repository, an imaging device to capture video in real-time, and/or a repository of video/audio clips. In one embodiment, an encoder 106 reads the data and entropy/arithmetic encodes it into a byte stream. The encoder 106 may be implemental within a server suite.

In one embodiment, video/audio services are provided to a client engine (e.g., clients 103-104), which is a product suite encapsulating a network stack implementation (as shown in FIG. 3) and a proprietary decoder (e.g., 108-109). This suite can accept a digital payload at various data rates and footprint formats, segregate the audio and video streams, decode each byte stream independently, and display the data in a coherent and real-life manner.

In one embodiment, encoder module 106 reads raw data in a variety of data formats, (which includes, but is not limited to, RGB x:y:z, YUV x':y':z', YCrcb x":y":z", where the letter symbols denote sub-sampling ratios etc.), and converts them into one single standard format for purposes of standardization and simplicity. According to one embodiment, irrespective of the mode of data acquisition, the digital information is read frame wise in a non-interleaved raster format. In case of pre-recorded video compression, the encoder unit 106 segregates the audio and video streams prior to actual processing. This is useful since the encoding and decoding mechanisms used for audio and video may be different.

In one embodiment, the frame data is then fed into a temporary buffer, and transformed into the spatial-frequency domain using a unique set of wavelet filtering operations. The ingenuity in this wavelet transformation lies in its preclusion of extra buffering, and the conversion of computationally complex filtering operations into simple addition/subtraction operations. This makes the wavelet module in this codec memory more efficient.

Figure 7:
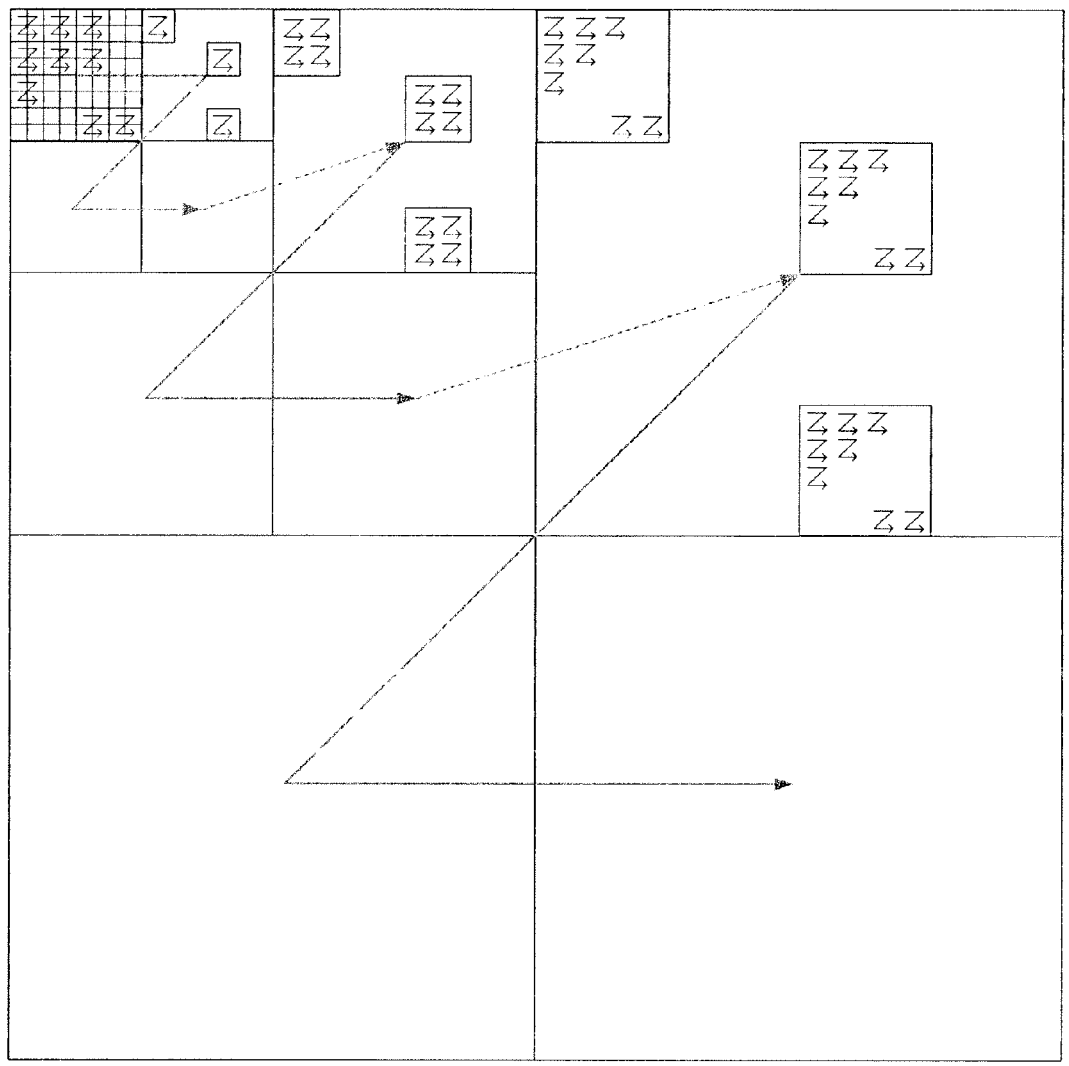

In one embodiment, the source encoder/decoder performs compression of the data by reading the wavelet coefficients of every sub-band of the frame obtained from the previous operation in a unique zigzag fashion, known as a Morton scan (similar to the one shown in FIG. 7). This allows the system to arrange the data in an order based on the significance of the wavelet coefficients, and code it in that order. The coding alphabet can be classified into significance, sign and refinement classes in a manner well-known in the art (e.g., JPEG 2000, etc.)

Based on the location of the pixel coefficient being coded in the sub-band map, the significance, sign and bit plane information of the pixel is coded and transmitted into the bytestream. The first set of coefficients to be coded thus is the coarsest sub-band in the top-left corner of the sub-band map. Once the coarsest sub-band has been exhausted in this fashion, the coefficients in the finer sub-bands are coded in a similar fashion, based on a unique tree-structure relationship between coefficients in spatially homologous sub-bands.

To further exploit the redundancy of the bit stream, it is partitioned into independent logical groups of bits, based on their source in the sub-band tree map and the type of information it represents (e.g., significance, sign or refinement), and is arithmetic coded for further compression. This process that achieves results is similar to, but superior to, the context-based adaptive binary arithmetic coding (CABAC) technique specified in the H.264 and MPEG4 standards.

The temporal redundancy between consecutive frames in a video stream is exploited to reduce the bit count even further, by employing a motion prediction scheme. In one embodiment, motion is predicted over four coarsest sub-bands, and by employing a type of affined transformation, is predicted in the remaining finer sub-bands using a lower-entropy refinement search. The effective search area for predicting motion in the finer sub-bands is lesser than in the coarser sub-bands, leading to a speed-up in the overall performance of the system, along with a lower bit-rate as compared to similar video compression systems in current use.

In one embodiment, the video decoder (e.g., decoders 108-109) works in a manner similar to the encoder, with the exception that it does not have the motion prediction feedback loop. To compensate for the spatial and temporal redundancies in the data, the decoder performs the relatively opposite operations as in the encoder. In one embodiment, the byte stream is read on a bit-by-bit basis, and the coefficients are updated using a non-linear quantization scheme, based on the context decision. Similar logic applies to the wavelet transformation and arithmetic coding blocks.

Once the bit budget is exhausted, according to one embodiment, the updated coefficient map is inverse wavelet transformed using a set of arithmetic lifting operations, which may be reverse of the operations undertaken in the forward wavelet transform block in the encoder, to create the reconstructed frame. The reconstructed frame is then rendered by a set of native API (application programming interface) calls in the decoder client.

Techniques described herein are compatible with peer-peer video/audio, text/multimedia messaging, download-and-play and streaming broadcast solutions available from any third party content or service provider. For this purpose, according to one embodiment, the codec suite is made compatible with several popular third party multimedia network protocol suites.

In one embodiment, the exemplary system can be deployed on a variety of operating systems and environments, both on the hand-held as well as PC domain. These include, but are not restricted to, Microsoft® Windows® 9x/Me/XP/NT 4.x/ 2000, Microsoft Windows® CE, PocketLinux™ (and its various third party flavors), SymbianOS™ and PalmOS™. It is available on a range of third-party development platforms. These include, but are not limited to, Microsoft® PocketPC™ 200X, Sun Microsystems® J2ME™ MIDP® X.0/ CLDC® X.0, Texas Instruments® OMAP™ and Qualcomm® BREW™. On the hardware front, embodiments of the invention can be provided as a solution on a wide range of platforms including, but not limited to, Field Programmable Gate Arrays (FPGA), Application Specific Integrated Circuits (ASIC) and System-on-Chip (SoC) implementations.

Exemplary Systems

A technique to enhance the delivery of audio and video multimedia data over low-bandwidth wireless networks is described herein. The following paragraphs explain the structure of an integrated system that provides services to a user from a single consolidated platform. It addresses transcoding and scalability issues, as well as integration between different third-party network protocol implementations..

Figure 2:
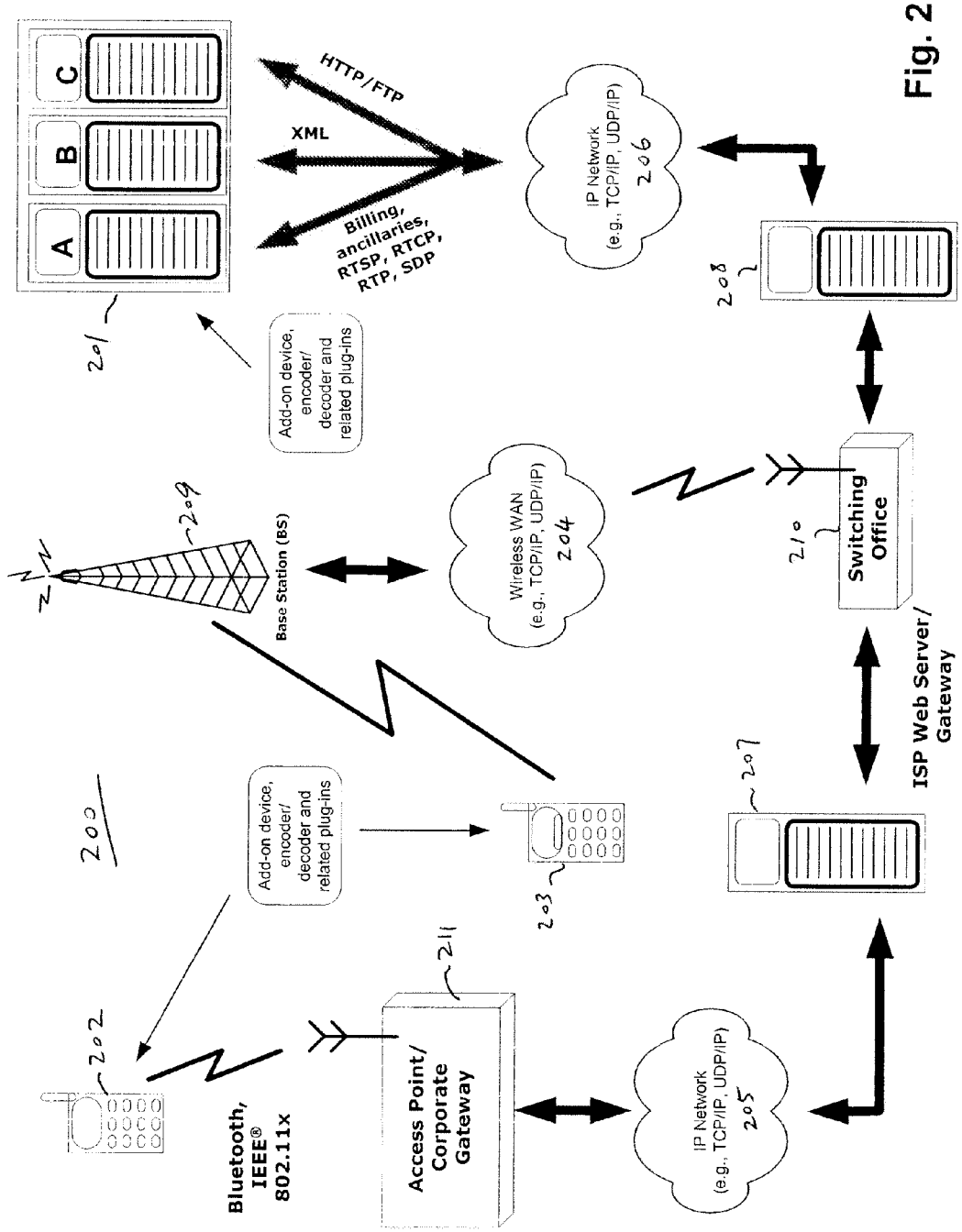
FIG. 2 is a block diagram illustrating an exemplary multimedia streaming system according to one embodiment.

FIG. 2 is a block diagram illustrating an exemplary multimedia streaming system according to one embodiment. Referring to FIG. 2, exemplary system 200 includes a server or servers 201 communicatively coupled to one or more clients 202-203 over a various types of networks, such as wireless network 204 and/or wired networks 205-206, which may be the same network. For example, server 201 may be implemented as server 101 of FIG. 1. Clients 202-203 may be implemented as clients 103-104 of FIG. 1. In one embodiment, the server platform 201 includes, but is not limited to, three units labeled A, B and C. However, it is not so limited. These units may be implemented as a single unit or module. These units can communicate with one another, as well with external units, to provide all relevant communication and video/audio processing capabilities.

Unit C may be an application server, which provides download services for client-side components such as decoder/ encoder APIs to facilitate third party support, browser plug-ins, drivers and plug-and-play components. Unit B may be a web services platform. This addresses component reusability and scalability issues by providing COM™, COM+™, EJB™, CORBA™, XML and other related web and/or MMS related services. These components are discrete and encapsulate the data. They minimize system dependencies and reduce interaction to a set of inputs and desired outputs. To use a component, a developer may call its interface. The functionality once developed can be used in various applications, hence making the component reusable. The components are decoupled from each other, hence different parts can be scaled without need to change the entire application. Because of these features, the applications could be customized to provide differentiating services and could be scaled to handle more customers as the demand grows. Unit A may be an actual network services platform. Unit A provides network services required to transmit encoded data over the wireless network, either in a D&P (Download and Play) or a streaming profile. Unit A also provides support for peer-to-peer (P2P) communications in mobile video conferencing applications, as well as communicates with the wireless service provider to expedite billing and other ancillary issues.

According to one embodiment, for the purposes of illustration, three main types of scenarios are described herein.

However, other types of scenarios may be applied. In one instance, a user 203 with unrestricted mobility (such as a person driving a car downtown) is able to access his or her wireless multimedia services using the nearest wireless base station (BS) 209 of the service provider to which he or she subscribes. The connection could be established using a wide range of technologies including, but not limited to, WCDMA [UMTS], IS-95 A/B-CDMA 1.X/EVDO/EVDV, IS-2000-CDMA2000, GSM-GPRS-EDGE, AMPS, iDEN/WiDEN, and Wi-MAX. The BS 209 communicates with the switching office (MTSO) 210 of the service provider over a TCP/IP or UDP/IP connection on the wireless WAN 204. The MTSO 210 handles hand-off, call dropping, roaming and other user profile issues. The payload and profile data is sent to the wireless ISP server for processing.

In another type of scenario, the user 202 has limited mobility, for example, within a home or office building (e.g., a LAN controlled by access point/gateway 211). Such a user sends in a request for a particular service over a short-range wireless connection, which includes, but is not restricted to, a Bluetooth™, Wi-Fi™ (IEEE™ 802.11x), HomeRF, HiperLAN/1 or HiperLan/2 connection, via an access point (AP) and the corporate gateway 211, to the web gateway of his or her service provider. The ISP communicates with the MTSO 210, to forward the request to the server suite 201. All communications are over a TCP/IP or UDP/IP connection 206. Once the required service has been processed by the server 201, the payload is transmitted over substantially the same route in the reverse direction back to the user.

In a third type of scenario, peer-to-peer (P2P) communication is enabled by bypassing the server 201 altogether. In this case, all communications, payload transfer and audio/video processing are routed or delegated through the wireless ISP server (e.g., server 207) without any significant load on the server, other than performing the functions of control, assignment, and monitoring.

The system capabilities may be classified based on the nature of the services and modes of payload transfer. In a D&P service, the user waits for the entire payload (e.g., video/audio clip) to be downloaded onto his or her wireless mobile unit or handset before playing it. Such a service has a large latency period, but can be transported over secure and reliable TCP/IP connections.

In a streaming service, the payload routing is the same as before, with the exception that it is now transported over a streaming protocol stack (e.g., RTSP/RTP, RTCP, SDP) over a UDP/IP network (e.g., networks 205-206). This ensures that the payload packets are transmitted quickly, though there is a chance of data corruption (e.g., packet loss) due to the unreliable nature of the UDP connection. In P2P services, the payload is routed through a UDP/IP connection, to ensure live video/audio quality needed for video conferencing applications.

The decoder as well as the encoder may be available on hardware, software, or a combination of both. For download-and-play and streaming services, the encoder may be stored in the remote server, which provides the required service over an appropriate connection, while a lightweight software decoder may be stored in the memory of the wireless handheld terminal. The decoder APIs can be downloaded from an application server (e.g., unit A) over an HTTP/FTP-over-TCP/IP connection. For services that require more interaction, such as MMS and P2P video conferencing services, both the encoder (e.g., on a stand-alone hardware platform riding piggy-back on the handset chipset) as well as decoder (e.g., an application layer software) are installed on the handheld terminal, for example, integrated within a network protocol stack as shown in FIG. 3.

Exemplary Data Compression Processes

Figure 4A:
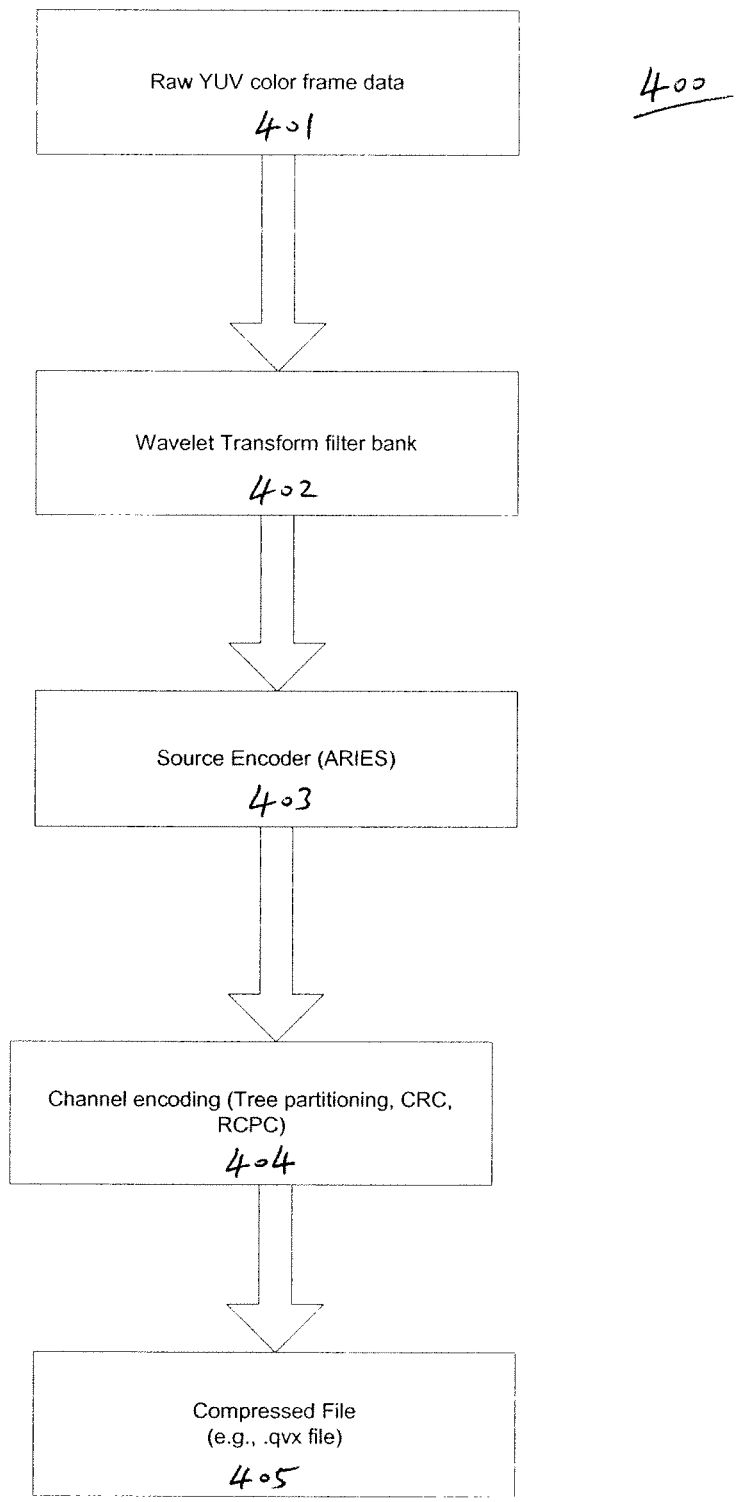
FIGS. 4A and 4B are block diagram illustrating exemplary encoding and decoding systems according to certain embodiments.
Figure 4B:
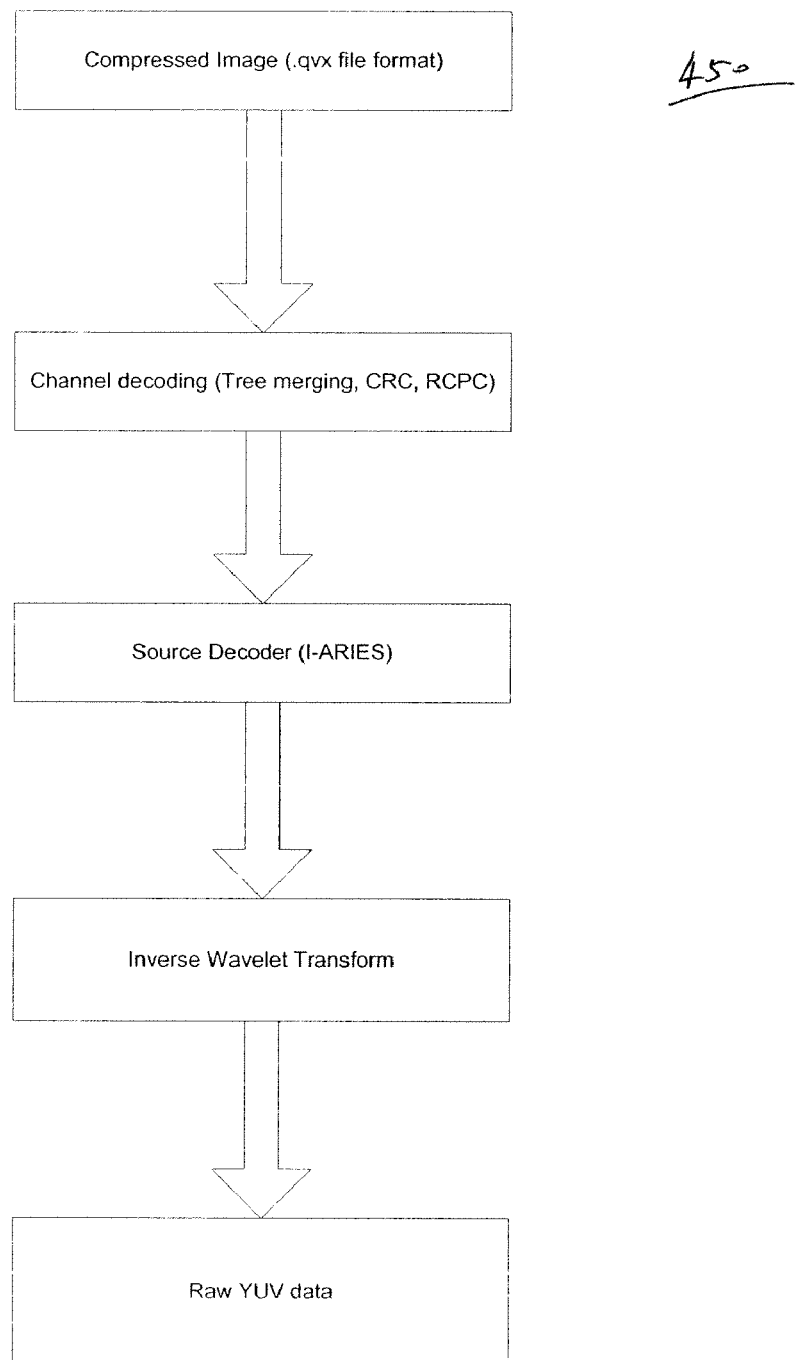
Figure 5:
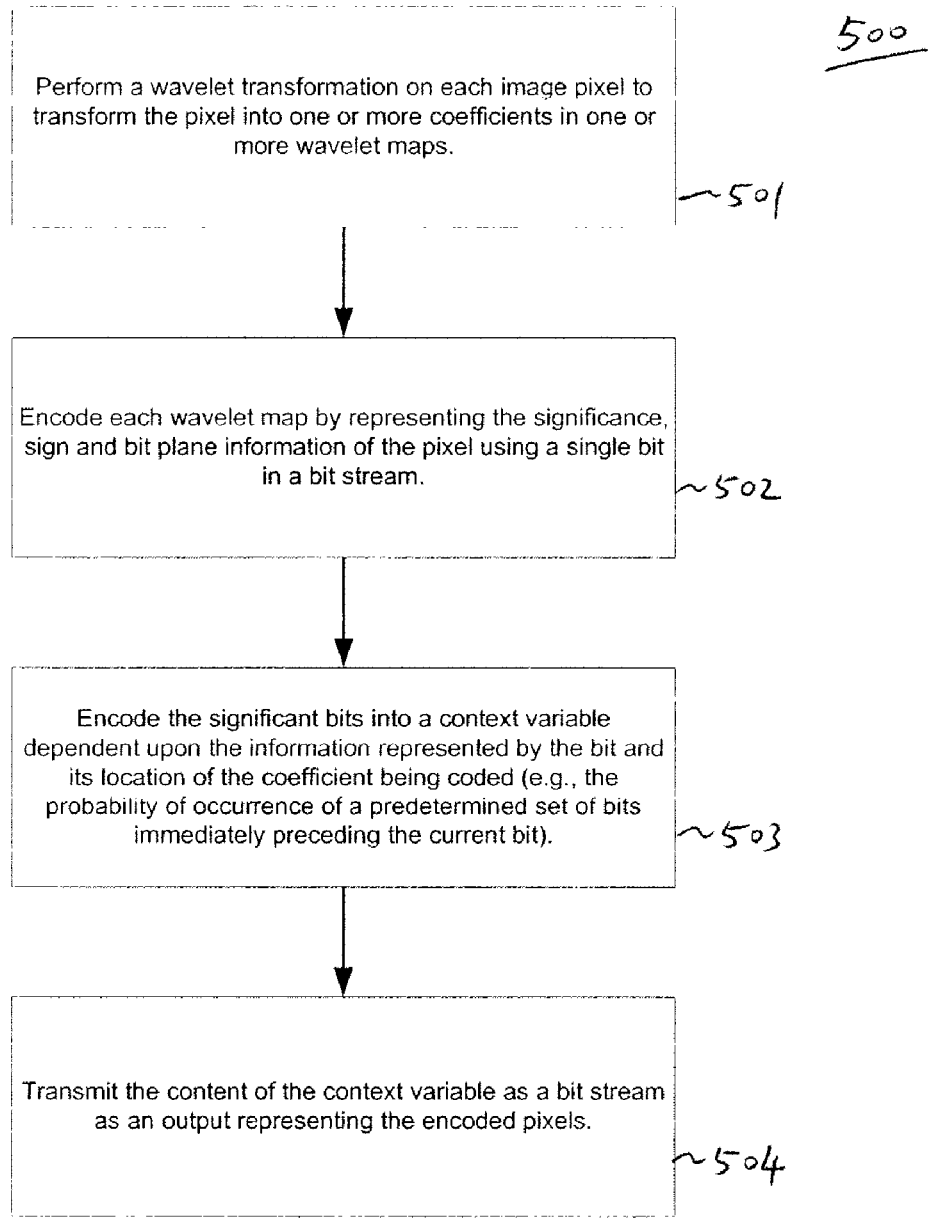
FIG. 5 is a flow diagram illustrating an exemplary encoding process according to one embodiment.

FIGS. 4A and 4B are data flow diagrams illustrating exemplary encoding and decoding processes through an encoding system and a decoding system respectively, according to certain embodiments of the invention. FIG. 5 is a flow diagram illustrating an exemplary process for encoding digital image data according to one embodiment. The exemplary process 500 may be performed by processing logic that may include hardware (e.g., circuitry, dedicated logic, etc.), software (such as is run on a general-purpose computer system, a server, or a dedicated machine), or a combination of both. For example, exemplary process 500 may be performed by a server component (e.g., server suite), such as, for example, server 101 of FIG. 1 or sever 201 of FIG. 2.

Referring to FIGS. 4A and 5, the codec works on a raw file format 401 having raw YUV color frame data specified by any of the several standard file and frame formats including, but not limited to, high definition television (HDTV), standard definition television (SDTV), extended video graphics array (XVGA), standard video graphics array (SVGA), video graphics array (VGA), common interchange format (CIF), quarter common interchange format (QCIF) and sub-quarter interchange format (S-QCIF). In one embodiment, the pixel data is stored in a byte format, which is read in serial fashion and stored in a 1-dimensional array.

In one embodiment, each image, henceforth to be called the 'frame', includes three maps. Each of these maps may be designated to either store one primary color component, or in a more asymmetric scheme, one map stores the luminance information (also referred to as a luma map or Y map), while the other two maps store the chrominance information (also referred to as chroma maps or Cb/Cr maps). The Y map stores the luma information of the frame, while the chroma information is stored in two quadrature components. The system is designed to work on a wide variety of chrominance sub-sampling formats (which includes, but is not restricted to, the 4:1:1 color format). In this case, the dimensions of the chroma maps are an integral fraction of the dimensions of the luma map, along both the cardinal directions. The pixel data is stored in a byte format in the raw payload file, which is read in serial fashion and stored in a set of 3 one-dimensional arrays, one for each map.

Since the dimensions of the frame are previously known, the 2-dimensional co-ordinate of each pixel in the image map is mapped onto the indexing system of the 1-dimensional array representing the current color map. The actual 1-dimensional index is divided by the width of the frame, to obtain the "row number". A modulo operation on the 1-dimensional index gives a remainder that is the "column number" of the corresponding pixel.

In one embodiment, as one of the more significant pre-processing operations, the pixel coefficient values are scaled up by shifting the absolute value of each pixel coefficient by a predetermined factor (e.g., factor of 64). This increases the dynamic range of the pixel coefficient values, thereby allowing for a finer approximation of the reconstructed frame during decoding.

The next operation in the encoding process is to transform the payload from the spatial domain into the multi-resolution domain. In one embodiment, a set of forward and backward wavelet filter 402 coefficients with an integral number of taps is used for the low pass and high pass filtering operations (e.g., operation 501). In one embodiment, the filter coefficients may be modified in such a way that all operations can be done in-place, without a need for buffering the pixel values in a separate area in memory. This saves valuable volatile-memory space and processing time.

Exemplary Wavelet Filtering Operations

In one embodiment, the wavelet filtering operations on each image pixel are performed in-place, and the resultant coefficients maintain their relative position in the sub-band map. In one embodiment, the entire wavelet decomposition process is split into its horizontal and vertical components, with no particular preference to the order in which the cardinal orientation of filtering may be chosen. Due to the unique lifting nature of the filtering process, the complex mathematical computations involved in the filtering process is reduced to a set of fast, low-complexity addition and/or subtraction operations.

In every pass, according to one embodiment, a row or column (also referred to as a row vector or a column vector) is chosen, depending on the direction of the current filtering process. In a particular embodiment, a low pass filtering operation is performed on every pixel that has an even index relative to the first pixel in the current vector, and a high pass filtering operation is performed on every pixel that has an odd index relative to the first pixel of the same vector. For each filtering operation, the pixel whose wavelet coefficient is to be determined, along with a set of pixels symmetrically arranged around it in its neighborhood along the current orientation of filtering, in the current vector is chosen.

Wavelet filters with a vanishing moment of four is applied on the pixels. In one embodiment, four tap high pass and low pass filters are used for the transformation. The high pass filter combines the four neighboring even pixels weighted and normalized, as shown below, for filtering an odd pixel $$[9*(X_{k-1}+X_{k+1})-(X_{k-3}+X_{k+3})+16]/32$$

The low pass filter combines the four neighboring odd pixels weighted and normalized, as shown below, for filtering an even pixel $$[9*(X_{k-1}+X_{k+1})-(X_{k-3}+X_{k+3})+8]/16$$

where $X_k$ is the pixel at position k.

Different normalized weights are applied to each pixel (with a weight of 1.0 being applied to the (central) pixel whose transformed value is to be determined), and a series of addition, subtraction and multiplication operations generate the wavelet coefficient in the same pixel position relative to the beginning of the current vector. It can be deduced that all pixel positions with even indices within a particular vector (row or column) (0, 2, 4, . . . ) represent low pass coefficients, while all pixel positions with odd indices within a particular vector (row or column) (1, 3, 5 . . . ) represent high pass coefficients. Each such an iteration or pass, creates four sets of coefficients, each constituting a sub-band or sub-image.

These four sub-bands are intimately inter-meshed into one another. In the first pass, for instance, coefficients belonging to the same sub-image are at an offset of 1 pixel position from one another. In the next pass, all the low pass coefficients (which constitute the $LL_k$ sub-image) are selected, and the entire process is repeated. This operation shall, likewise, result in four sub-images with each sub-image having pixels, which are at an offset of 2 pixel positions from each other. Due to the iterative decimation, every pass involves computations on exactly one-quarter the number of pixels as compared to the previous pass, with the offset between pixels in the same sub-image at the same level, doubling with every iteration.

Alternative Wavelet Filtering Operations

In another embodiment, the wavelet filtering operation is viewed as a dyadic hierarchical filtering process, meaning that the end-result of a single iteration of the filtering process on the image is to decimate it into four sub-bands, or sub-images, each with half the dimensions in both directions as the original image. The four sub-bands, or sub-images are labeled as $HH_k$, $HL_k$, $LH_k$ and $LL_k$ (where k is the level of decomposition beginning with one for the finest level), depending on their spatial orientation relative to the original image. In the next iteration, the entire filtering process is repeated on only the $LL_k$ sub-image obtained in the previous pass, to obtain four sub-images called $HH_{k-1}$, $LH_{k-1}$, $HL_{k-1}$ and $LL_{k-1}$, which have half the dimensions of $LL_k$, as explained above. This process is repeated for as many levels of decomposition as is desired, or until the LL sub-band has been reduced to a block which is one pixel across, in which case, further decimation is no longer possible.

In one embodiment, the filtering is split into horizontal and vertical filtering operations. For the vertical filtering mode, each column (e.g., vertical vector) in the three maps is processed one at a time. Initially, all the pixels in the column are copied into a temporary vector, which has as many locations reserved as there are pixels in the vector. For the actual filtering operation, the temporary vector is split into two halves. Pixels located in the even numbered memory locations (such as 0, 2, 4, . . . ) of the temporary vector are low pass filtered using the low pass filter (LPF) coefficients, while the pixels in the odd numbered memory locations (such as 1, 3, 5, . . . ) of the temporary vector are high pass filtered using the high pass filter (HPF) coefficients.

The result of each filtering operation (high-pass or low-pass) is stored in the current vector, such that all the results of the low-pass filtering operations are stored in the upper half of the vector (e.g., the top half of a vertical vector, or the left half of a horizontal vector, depending on the current orientation of filtering), while the results from the high-pass filtering operations are stored in the lower half of the column (e.g., the bottom half of a vertical vector, or the right half of a horizontal vector). In this way, the pixel data is decimated in a single iteration. The entire process is repeated for all the columns and rows in the current map and frame. The entire process is repeated for all three maps for the current frame, to obtain the wavelet transformed image.

Referring back to FIG. 4A, the bootstrapped source entropy and arithmetic coding process 403 of the wavelet map is also referred to as channel coding (e.g., operation 502). The arithmetic coding exploits the intimate relationships between spatially homologous blocks within the sub-band tree structure generated in the wavelet transformation 402 described above. The data in the wavelet map is encoded by representing the significance (e.g., with respect to a variable-size quantization threshold), sign and bit plane information of the pixels using a single bit alphabet. The bit stream is encoded in an embedded form, meaning that all the relevant information of a single pixel at a particular quantization threshold is transmitted as a continuous stream of bits. The quantization threshold depends on the number of bits used to represent the Wavelet coefficients. In this embodiment, sixteen bits are used for representing the coefficients. Hence for the first pass the quantization threshold is set, for example, at 0x8000. After a single pass, the threshold is lowered, and the pixels are encoded in the same or similar order as before until substantially all the pixels have been processed. This ensures that all pixels are progressively coded and transmitted in the bit stream.

According to one embodiment, the entropy coded bit stream is further compressed by passing the outputted bit through a context based adaptive arithmetic encoder 404 (also referred to as a channel encoder), as shown as operation 503.

This context based adaptive binary arithmetic coder (CABAC) encodes the bit information depending on the probability of occurrence of a predetermined set of bits immediately preceding the current bit. The context in which the current bit is encoded depends on the nature of the information represented by the bit (significance, sign or bit plane information) and the location of the coefficient being coded in the hierarchical tree structure. The concept of a CABAC is similar in principle to the one specified in the ITU-T SG16 WP3 Q.6 (VCEG) Rec. H.264 and ISO/IEC JTC 1/SC 29/WG 11 (MPEG) Rec. 14496-10 (MPEG4 part 10). The difference lies in the context modeling, estimation and adaptation of probabilities. Since the transform and source coding technique of the embodiment is different from ITU-T SG16 WP3 Q.6 (VCEG) Rec. H.264 and ISO/IEC JTC 1/SC 29/WG 11 (MPEG) Rec. 14496-10 (MPEG4 part 10), the coefficients of the embodiment has different statistical characteristics. The CABAC-type entropy coder, as specified in the embodiment, is designed to exploit these characteristics to the maximum.

In one embodiment, the context is an n-bit data structure with a dynamic range of 0 to $2^n$. With every new bit coded, the context variable assigned to the current bit is updated, based on a probability estimation table (PET). Once n bits have been coded, the contents of the context variable is packed into a compact data structure as compressed file 405 and transmitted onward, and the variable is refreshed for the next batch of n bits (e.g., operation 504). In one embodiment, the system uses (9×m) context variables for each frame—for three bit classes over three spatial orientation trees, and all sub-bands over m levels of decomposition.

According to one embodiment, the decoder, which may reside in the client, may be implemented similar to the exemplary encoder 400 of FIG. 4A, but in a reversed order as shown in FIG. 4B.

Exemplary Encoding Hierarchy

Figure 6:
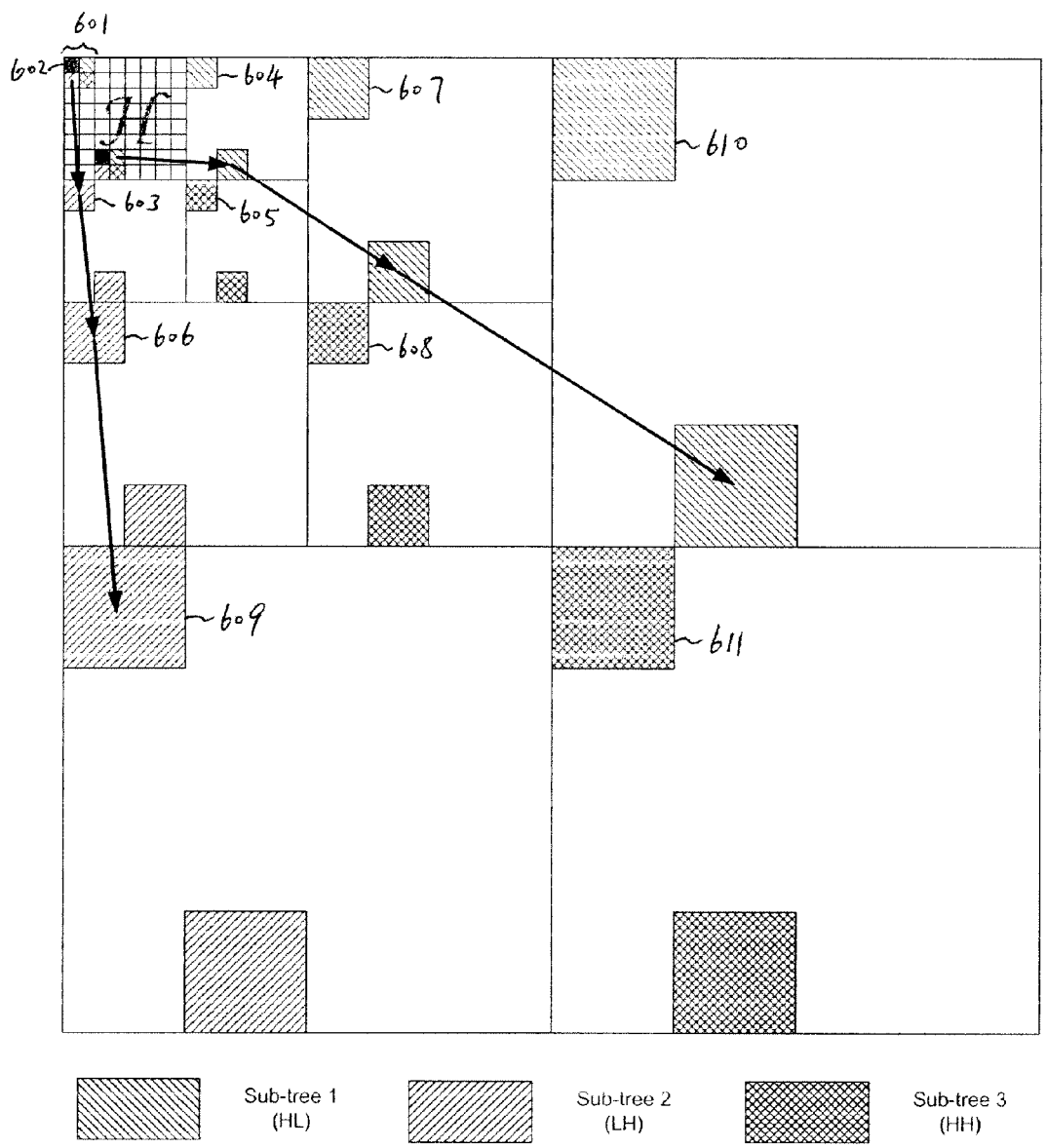
FIGS. 6 and 7 are block diagrams illustrating exemplary pixel maps according to certain embodiments.

The hierarchical tree structure relating spatially homologous pixels and their descendants can be explained using a parent-child hierarchy. FIG. 6 is a diagram illustrating an exemplary pixel map for encoding processing according to one embodiment. Referring to FIG. 6, in one embodiment, the root of the tree structure may be made up of the set of all the pixels in the coarsest sub-band, $LL_k$, and the set be labeled as H. In one embodiment, the pixels in set H are grouped in sets of 2×2, or quads. Referring to FIG. 6, each quad in set H (e.g., block 601) has four pixels, with all but the top-left member 602 of every quad having four descendants (e.g., blocks 603-605) in the spatially homologous next finer level of decomposition. Thus, for instance, the top-right pixel in a quad has four descendant pixels 604 (in a 2×2 format) in the next finer sub-band with the same spatial orientation ($HL_{k-1}$ in this case). The relative location of the descendants, too, is related to the spatial orientation of the tree root. The first generation descendants of a coefficient (henceforth labeled as offspring) of the top-right pixel in the top-left quad of set H are the top-left 2×2 quad in $HL_{k-1}$ (e.g., block 604). Similarly, the offspring of the bottom right pixel in any quad of set H lie in spatially homologous positions in the $HH_{k-1}$ sub-band, while the descendants of the bottom left pixel in any quad of set H lie in spatially homologous positions in the $LH_{k-1}$ sub-band (e.g., block 603). Descendants beyond the first generation of pixels, and sets (including quads) thereof, are generally labeled as grandchildren coefficients, for example, blocks 606-611 as shown in FIG. 6.

For the encoding process, in one embodiment, a unique data structure records the order in which the coefficients are encoded. Three dynamically linked data structures, or queues, are maintained for this purpose, labeled as insignificant pixel queue (IPQ), insignificant set queue (ISQ) and significant pixel queue (SPQ). In one embodiment, each queue is implemented as a dynamic data structure, which includes, but is not restricted to, a doubly linked list or a stack array structure, where each node stores information about the pixel such as coordinates, bit plane number when the pixel becomes significant and type of ISQ list.

In one embodiment, three types of sets of transform coefficients are defined to partition the pixels and their descendant trees. However, more or less sets may be implemented. The set D(T) is the set of all descendants of a pixel, or an arbitrary set, T, thereof. This includes direct descendants (e.g., offspring such as blocks 603-605) as well as grandchildren coefficients (e.g., blocks 606-608). The set O(T) is defined as the set of all first generation, or direct, descendants of a pixel, or an arbitrary set, T, thereof (e.g., blocks 603-605). Finally, the set L(T) is defined as the set of descendants other than the offspring of a pixel, or an arbitrary set, T, thereof, i.e., L(T)=D(T)−O(T) (e.g., blocks 609-611). In one embodiment, two types of ISQ entries may be defined. ISQ entries of type α represent the set D(T). ISQ entries of type β represent the set L(T).

In one embodiment, a binary metric used extensively in the encoding process is the significance function, $S_n(T)$. In one embodiment, the significance function gives an output of one if the largest wavelet coefficient in the set T is larger than the current quantization threshold level (e.g., the quantization threshold in the current iteration), or else give an output of zero. In one embodiment, the significance function may be defined as follows:

$$S_n(\tau) = \begin{cases} 1, & \max\{|c_{i,j}|\} \geq 2^{n_i} \ (i, j) \in \tau \\ 0, & \text{otherwise} \end{cases}$$

where, $S_n(T)$ is the set of pixels, T whose significance is to be measured against the current threshold, $n_1$.

Figure 8:
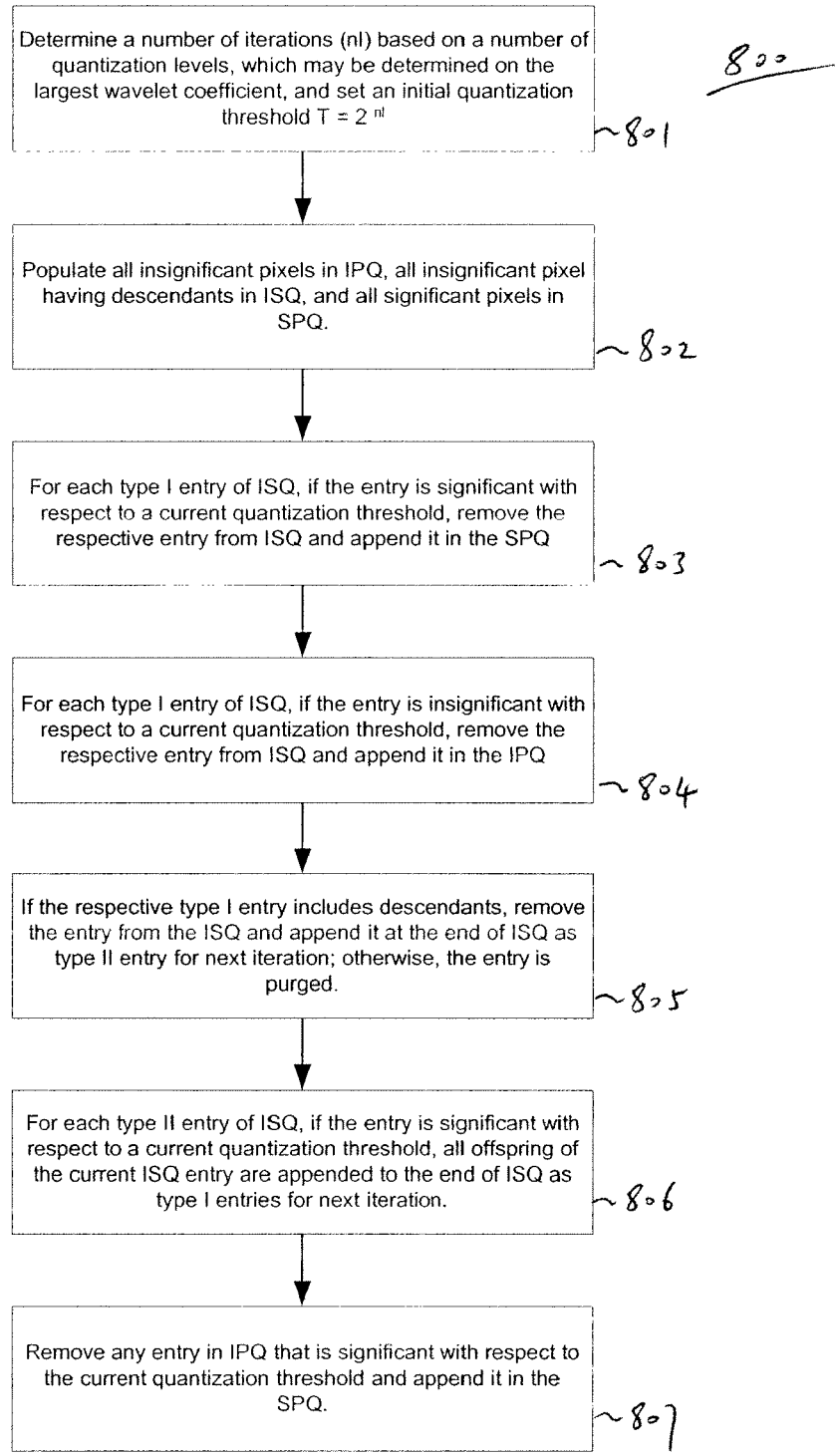
FIG. 8 is a flow diagram illustrating an exemplary encoding process according to an alternative embodiment.

FIG. 8 is a flow diagram illustrating an exemplary encoding process according to one embodiment. The exemplary process 500 may be performed by processing logic that may include hardware (e.g., circuitry, dedicated logic, etc.), software (such as is run on a general-purpose computer system, a server, or a dedicated machine), or a combination of both. For example, exemplary process 500 may be performed by a server component (e.g., server suite), such as, for example, server 101 of FIG. 1 or sever 201 of FIG. 2.

Referring to FIG. 8, the first phase in the encoding process of the encoder (also referred to as the initialization pass) is the determination and transmission (as a sequence of 8 bits, in binary format) of the number of passes the encoder has to iterate through (block 801). The number of iterations, according to one embodiment, is less than or equal to the number of bit-planes of the largest wavelet coefficient in the current map. The number of iterations to code all the bits in a single map is determined by the number of quantization levels. In one embodiment, this is determined using a formula that may be defined as follows:

$$n_1 = \text{ceil}(\log_2|w_{max}|)$$

where $w_{max}$ is the largest wavelet coefficient in the current map. This number is transmitted (without context) into the byte stream. The coding process is then iterated $n_1$ times over the entire map.

Initially, at block 802, in one embodiment all pixels are marked as insignificant against the current threshold level, which may be defined as $T=2^{n_1}$. Hence, IPQ is populated with all the pixels in set H, while ISQ is populated with all the pixels in set H that have descendants (i.e., in set H, all the pixels in every quad except the top-left one). The SPQ is kept empty and is filled gradually as pixels become significant against the current quantization threshold.

As a next phase, at block 803, also referred to as a sorting pass, in one embodiment, all the pixels in the IPQ are sorted to determine which ones have become significant with respect to a current quantization threshold. For every entry in the IPQ, the value of the significance function for the current pixel (or entry in the IPQ) is determined, and the value is sent out as the output in the form of a single bit. In one embodiment, as a next operation, the sign bit of the pixel entry, if the value of the significance function in the previous operation were one, is sent as the output in the form of a single bit. The output of the sign is 1 if the entry is positive and 0 if the entry is negative. Once all the significant pixels in the set H have been segregated from the insignificant ones, a more complex version of the same sorting pass is performed on the entries of the ISQ.

In one embodiment, at block 804, if the current entry of the ISQ is of type α (e.g., the class of entries that represents all the descendants of the pixel across all generations), the significance of the set D(T) is transmitted as a single bit. If this output bit is one (e.g., the entry has one or more significant descendants), a similar test is performed for the direct (e.g., first generation) descendants, or offspring of the entry. For all four offspring of the entry (defined by set O(T)), according to one embodiment, two operations are performed. First, the significance of the offspring pixel is determined and transmitted. As a second operation, if the offspring pixel is significant, the sign of the ISQ entry is transmitted. That is, a value of one is transmitted if the entry is positive, or a value of zero is transmitted if the entry is negative. The entry is then deleted from the ISQ and appended to the SPQ. If, however, the offspring pixel is insignificant, the offspring pixel is removed from the ISQ, and appended to the IPQ.

Once all the offspring pixels have been tested, the current ISQ entry is retained depending on the depth of the descendant hierarchy. If the entry has no descendants beyond the immediate offspring (L (T)≠(Ø), the entry is purged from the ISQ. If, however, descendants for the current set exist beyond the first generation, the entry is removed from its current position in the ISQ, and appended to the end of the ISQ as an entry of type β (block 805).

In one embodiment, if the current entry in the ISQ were of type β, the significance test is performed on the set L (T). For every entry in the ISQ of type β, the significance of the set L(T) is tested (e.g., using a significant function) and transmitted as a single bit. If there exists one or more significant pixels in the set L(T), all four offspring of the current ISQ entry are appended to the ISQ as type α entries at block 806, to be processed in future passes. The current entry in the ISQ is then purged from the queue at block 807.

In one embodiment, the final phase in the coding process is referred to as the refinement pass. At the end of the sorting pass, all the pixels (or sets thereof) that have become significant against the current quantization threshold level up to the current iteration are removed from the IPQ and appended to the SPQ. For every such entry, the iteration number "n", when the entry was appended to the queue (and the corresponding coefficient became significant against the current quantization threshold level), is recorded along with the co-ordinate information. For every entry in the SPQ that has been appended to it in previous iterations ($n_1, n_1-1 \ldots n_1-n$), the $n^{th}$ most significant bit is transmitted. As a final pass, in one embodiment, the value of n is decremented by one, so that the quantization threshold, T is reduced by half, and the entire process is repeated for all the entries currently listed in the three queues.

To achieve additional compression, in one embodiment, according to one embodiment, the output of the entropy coder may be passed through a CABAC-type processor. The embedded output stream of the entropy coder has been designed in a way, such that the compression is optimized by segregating the bit stream based on the context in which the particular bit has been coded. The bit stream includes the bits representing the binary decisions made during the coding. The bits corresponding to the same decisions are segregated and coded separately. Since the Wavelet transformed coefficients are arranged such that the coefficients with identical characteristics are grouped together, the decisions made on the coefficients in a group are expected to be similar or identical. Hence the bit-stream generated as a result would have longer runs of identical bits, making it more suitable for compression, and achieving more optimal level of compression.

Note that the wavelet coefficients "w" have a unique spatial correlation with one another, depending on which sub-band and tree it may belong to. Particularly, such a close correlation exists between the pixels of a single sub-band at a particular level, though the level of correlation weakens across pixels of different sub-bands in the same or different trees and levels. Also note that there is a run-length based correlation between bits that have the similar syntactic relationship. For example, some of the bits in the embedded stream represent sign information for a particular pixel, while others represent significance information. For example, a value of one in this case denotes that the pixel currently being processed is significant with respect to the current quantization threshold, while a zero value denotes otherwise. A third and final class of bits represent refinement bits, which encode the actual quantization error information.

In one embodiment, each bit in the output stream may be classified based on the nature of the information it represents (3 types) or the location in the sub-band tree map (3 $n_1+1$ possible locations, where $n_1$ is the number of levels of decomposition). This gives rise to 3×(3 $n_1+1$) possible contexts in which a bit can exist, and a unique context is used to code an arbitrary bit.

In order to implement the partitioning of the stream based on contexts, 3×(3 $n_1+1$), context variables act as an interface between the output of the entropy coder and the binary arithmetic coder. Each context variable is an 8-bit memory location, which updates its value one bit at a time, as additional coded bits are outputted. Once eight bits have been outputted, the contents of the memory location represented by the context variable under question are processed using a probability estimation table (PET). After transmitting the arithmetic encoded bits, the contents of the context variable are flushed out, for the next batch of 8 bits.

Alternative Source Encoding Schemes

In another embodiment, which is referred to as arithmetic coding II herein, the wavelet map may be split into blocks of size 32×32 (in pixels), and each such block is source coded independent of all other blocks in the wavelet map. For each wavelet map, if the dimensions of the map are not a multiple of 32 in either direction, a set of columns and/or rows are padded with zeros such that the new dimensions of the map is a multiple of 32 in both directions. In one embodiment, the coefficients in each such block are arranged in the hierarchical Mallat format. The number of levels of decomposition may be arbitrary. In one embodiment, the number is five, so that the coarsest sub-band in Mallat format of each block is one pixel across. Under such a scheme, there are ten partitions, also referred to as bands, with the finest ten sub-bands in the Mallat representation coinciding with the nine finest bands. The coarsest band is constructed by amalgamating the six coarsest sub-bands in the Mallat format.

In one embodiment, the bands are numbered in a zigzag manner, similar to the sequence shown in FIG. 7. The coarsest band is labeled as band 0, while the next three bands (HL, LH and HH orientations, in that order) are labeled as bands 1, 2 and 3 respectively, and so on. An additional data structure, known as a stripe, may be used to represent a set of 4×4 coefficients. Thus, each of bands 0, 1, 2 and 3 is made up of one such stripe. Bands in the second and third level of decomposition are made of four and sixteen stripes each.

Initially, according to one embodiment, quantization thresholds are assigned to all coefficients in band 0 (coarsest), as well as all finer bands. There exists a linear progressive relationship between the thresholds assigned to the various coefficients and bands in the wavelet map. The value of the thresholds are arbitrary, and a matter of conjecture and rigorous experimentation. In one embodiment, for a 5 level decomposition, the top-left (coarsest) sub-band (which is a part of the band 0) is assigned a particular threshold value (labeled x), while the top-right and bottom-left sub-bands of the same level of decomposition (also part of band 0) are assigned a threshold of 2x, and the threshold for the bottom-right sub-band is 4x.

Upon graduating to the next (finer) level of the decomposition tree, the threshold for the top-right and bottom-left sub-bands is the same as the threshold value of the bottom-right sub-band of the previous (coarser) level, while the bottom-right sub-band of the current (finer) level has a threshold that is double that value. This process is applied to the assignment of threshold values for all consecutive bands numbered 0 through 9 in the current block. For example, the initial thresholds for the four coarsest pixels in the top-left corner of band 0 are set at $4000_h$, $8000_h$, $8000_h$ and $10000_h$ (h denotes a number in hexadecimal notation). Similarly, the four-pixel quartet in the top-right corner of band 0 is assigned a threshold of $10000_h$, while the quartets in the bottom-left and bottom-right corner of band 0 are assigned thresholds of $10000_h$ and $20000_h$ respectively. With each successive iteration of the source coding scheme, the threshold for each sub-band and band explained above is reduced by half.

In one embodiment, the coding scheme includes four passes, labeled 0 to 3. In pass 0, in one embodiment, the decision on the significance of the current band is considered. In one embodiment, it may be assumed that the coarsest band (band 0) is always significant, since all the coefficients in the band are likely above the current threshold. For all other bands, if any one coefficient is above the current threshold for the particular band/sub-band, the current band is marked as significant. An extra bit (e.g., 1) is transmitted to the output stream to represent a significant band. If the current band has already been marked as significant, then no further action is necessary.

In pass 1, in one embodiment the decision on the significance of the stripes is considered. Each stripe is a set of 4×4 pixels, and each set of 2×2 pixels in the stripe has a hierarchical parent-child relationship with a homologous pixel in the previous coarser sub-band with the same orientation. Thus, each stripe has a parent-child hierarchical relationship with a 2×2 quad that is homologous in its spatial orientation in the previous coarser sub-band (see FIG. 11).

A stripe is designated as significant if its 2×2 quad parent (as explained above) is also significant, or the band within which the stripe resides has been marked as significant (in pass 0). A parent quad is marked as significant if one or more of the coefficients in the quad is above the current threshold level for the band in which the quad resides.

In pass 2, in one embodiment, the significance information of individual pixels in the current stripe, along with their sign information, is considered. As an initial operation, the number of pixels in the current stripe that are significant is recorded. This information is used to determine which context variable is to be used to code the significance information of the pixels in the current stripe (see discussion on CABAC above). For every pixel whose absolute value is above the current threshold for the current band and stripe, a binary 1 is transmitted, followed by a single bit for the sign of that coefficient (1 for a positive coefficient, or a 0 for a negative coefficient). If the current coefficient is insignificant, a 0 is transmitted, and its sign need not be checked. This test is performed on all 16 pixels in the current stripe, and is repeated over all the stripes in the current band, and for all bands in the current block of the wavelet map.

In pass 3, in one embodiment, the refinement information for each pixel in the current block is transmitted. For every band, each pixel is compared against the threshold level for the particular band and stripe. If the absolute value of the coefficient is above the threshold level for the current band and stripe, then a 1 (bit) is transmitted, else a 0 is transmitted.

In one embodiment, the first three passes (pass 0 to 2) are nested within each other for the current block, band and stripe. Thus, pass 0 is performed on every band in the current block, with the bands numbered sequentially in a zigzag fashion, and tested in that order. For each band, pass 1 for performed on all the stripes in the band in a raster scan fashion. Within the stripe, pass 2 is performed on every coefficient of the current stripe, also in raster scan mode. Pass 3 is performed on all the coefficients of the block, without consideration to the sequence of bands of stripes within the bands.

At the end of each iteration of the four pass routines explained above, the process is repeated for all blocks in the wavelet map. Once all the blocks in the wavelet map have been tested in this fashion, the process is repeated on the first block onwards, with the threshold levels for all bands in the block reduced to half its previous value. This continues until all the pixels have been coded down to their least significant bit plane or the bit-budget is completely exhausted.

Exemplary Motion Prediction Schemes

In one embodiment, a fast and efficient motion prediction scheme is made to take optimal advantage of the temporal redundancy inherent in the video stream. In one embodiment of the scheme, the spatial shift in the wavelet coefficient's location is tracked using an innovative, fast and accurate motion prediction routine, in order to exploit the temporal redundancy between the wavelet coefficients of homologous sub-bands in successive frames in a video clip.

It is well known that in multi-resolution representations, every sub-band, or sub-image, in the entire wavelet map for each frame in the video clip represents a sub-sampled and decimated version of the original image. To track motion between consecutive frames, a feedback loop is introduced in the linear signal flow path.

FIGS. 9A-9B and 10A-10B are block diagrams illustrating exemplary encoding and decoding processes according to certain embodiments of the invention. The overall motion in the original image is tracked by following the motion of homologous blocks of pixels in every sub-band of consecutive frames. In order to speed up the process, according to one embodiment, motion is tracked only in the luma (Y) map, while the same motion prediction information is used in the two chroma (Cr and Cb) maps. This works relatively well since it can be assumed that chroma information follows changes in the luma map fairly assiduously. Within the luma (Y) map, in one embodiment, a full-fledged search of the entire search space is performed only in the four coarsest sub-bands as shown in FIG. 6, while this information is scaled and refined using a set of affined transformations, for example, in the six finer sub-bands. This saves a considerable amount of bandwidth, due to the less number of bits that now needs to be coded and transmitted to represent the motion information, without any significant loss of fidelity.

In one embodiment, three categories of frames are decided upon, for labeling purposes, depending on the type of prediction the frame shall undergo to remove any inherent temporal redundancies using any of the motion prediction routines outlined herein, current frames that do not need to be predictively coded for temporal redundancies are labeled as intra-coded frames (I-frames). Frames that are coded using information from previously coded frames are called predicted frames (P-frames). Frames that need previously coded frames as well as frames that come after the current frame are called bi-directional frames (B-frames).

Figure 9A:
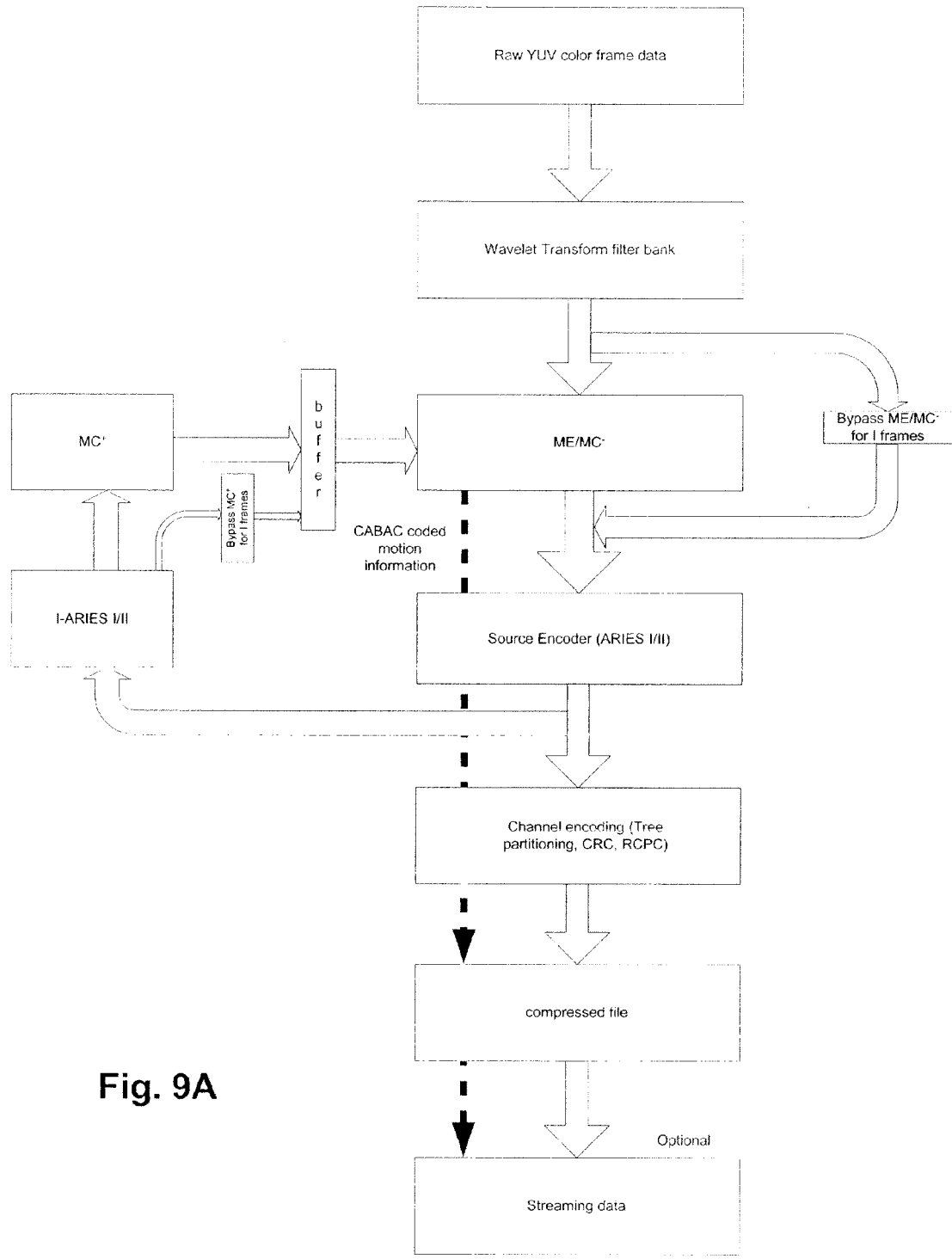
FIGS. 9A-9B and 10A-10B are block diagrams illustrating exemplary encoding and decoding systems with motion prediction according certain embodiments.
Figure 9B:
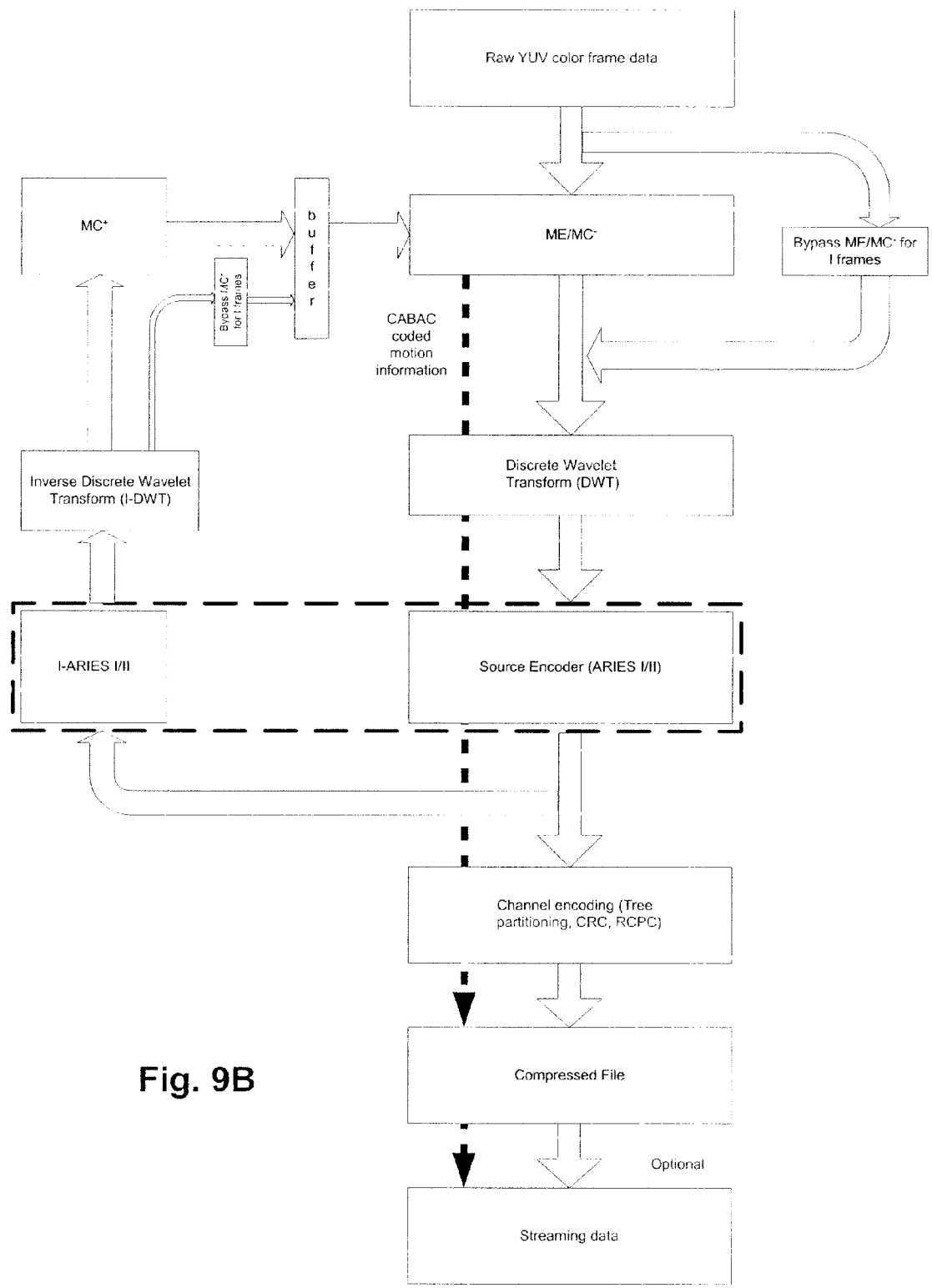

In one embodiment, referring to FIGS. 9A and 9B, the luma (Y) map of the current frame may be encoded using the arithmetic coding I/II scheme with a target bit-rate. Once the bit budget is exhausted (e.g. a number of bits encoded that will be transmitted within a period of time determined by the target bit rate), or all the bit-planes have been coded, the coding is stopped, and the similar reverse procedure (called inverse arithmetic coding I/II) is executed to recover the (lossy) version of the luma (Y) component of the wavelet map of the current frame. The version of arithmetic coding to be used here, is similar or the same as the version used in the forward entropy coder described above.

Figure 11:
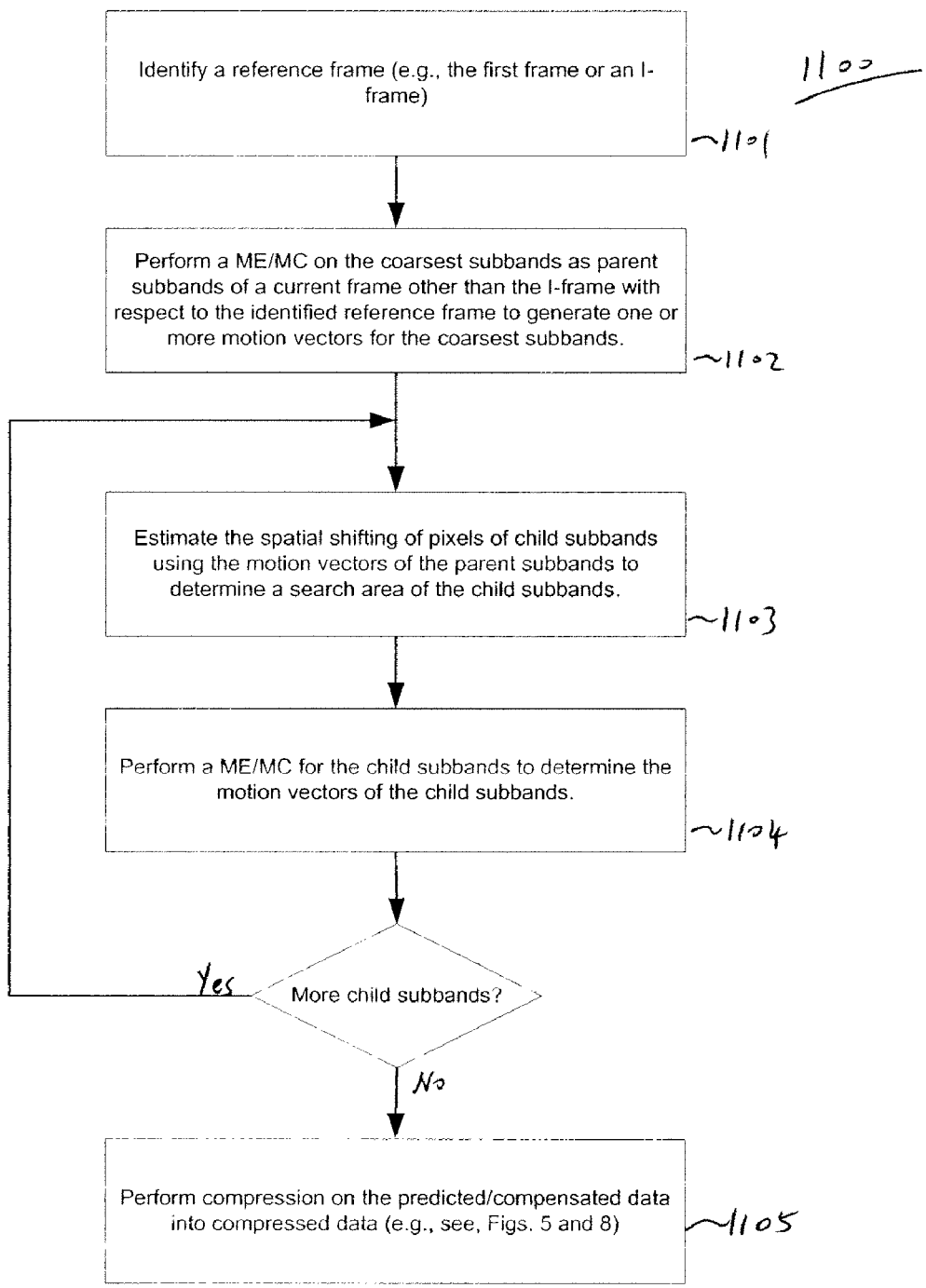
FIG. 11 is a flow diagram illustrating an exemplary encoding process with motion prediction according to one embodiment.

FIG. 11 is a flow diagram illustrating an exemplary process for motion prediction according to one embodiment. The exemplary process 1100 may be performed by processing logic that may include hardware (e.g., circuitry, dedicated logic, etc.), software (such as is run on a general-purpose computer system, a server, or a dedicated machine), or a combination of both. For example, exemplary process 1100 may be performed by a server component (e.g., server suite), such as, for example, server 101 of FIG. 1 or sever 201 of FIG. 2.

Referring to FIG. 11, for the first frame (and any successive frames which have been classified as I-frames in the video sequence, the recovered wavelet map is buffered as the reference frame, for use as a reference for the next frame in the sequence (block 1101). In one embodiment, the second frame is read and decomposed using the n-level wavelet decomposition filter-bank, to generate a new current frame. A unique search-and-match algorithm is performed on the wavelet map to keep track on pixels, and sets thereof, which have changed their location due to general motion in the video sequence. In one embodiment, the search algorithm is referred to as motion estimation (ME), while the match algorithm is referred to as motion compensation (MC$^-$).

As a first operation to the ME/MC$^-$ routine, in one embodiment, a lower threshold is set, to determine which coefficient values need to be tracked for motion, and eventually compensated for. In the predicted frames (P or B or otherwise), most coefficients in the finer sub-bands are automatically quantized to zero, while most of the coefficients in the coarsest sub-bands are typically not quantized to zero. Hence, it makes sense to determine the largest coefficient in the intermediate (level 2) sub-bands during the encoding process, which is quantized down to zero during the lossy reconstruction process, and use that as a lower threshold (also referred to as loThres).

Exemplary Coarse Motion Prediction

As the next operation, a traditional search-and-match is performed on the four coarsest sub-bands of the wavelet maps of the reference and current frames (block 1102). The motion prediction routine performed on these sub-bands involves a simple block search-and-match algorithm on homologous blocks of pixels. This operation identifies the blocks where motion has occurred. The amount of motion is determined and compensated for. This reduces the amount of information that is required to be transmitted, hence leading to better compression.

Figure 12:
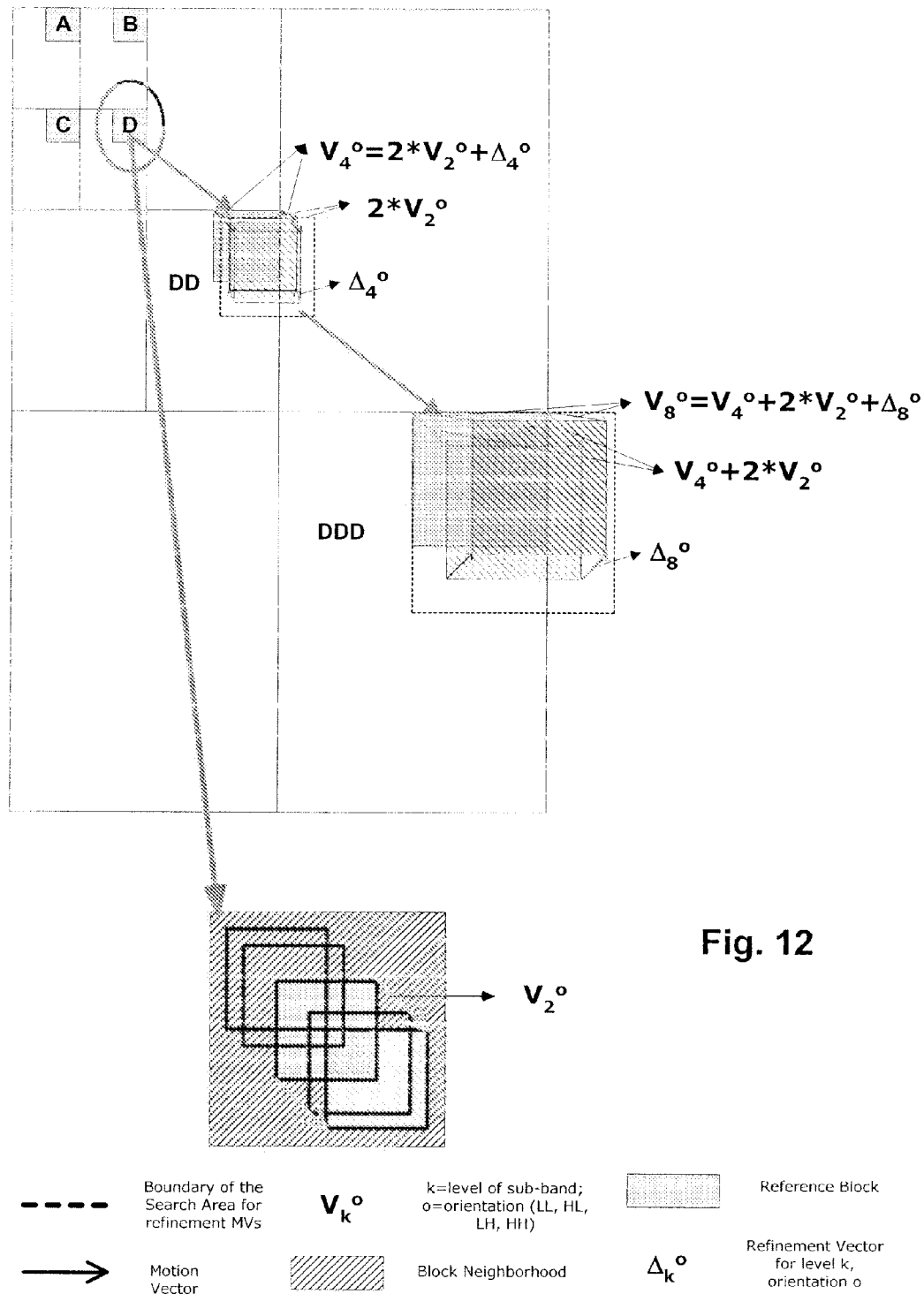
FIGS. 12-15 are block diagrams illustrating exemplary pixel maps according to certain embodiments.

To estimate motion of a block of pixels between the current and the reference wavelet maps, at block 1103, a block neighborhood is defined around the block of pixels in the reference map, whose motion is to be estimated (which is called the reference block), as shown in FIG. 12.

For the four coarsest sub-bands, the dimensions of the sub-bands are equal to $k=(w/2^n)$ and $l=(h/2^n)$, where w and h are the width and height of the original image with an n level decomposition. The depth of the neighborhood around the pixel block is usually set at equal to k and l respectively, though a slightly lower value (e.g., k–1 and l–1) performs equally well.

For blocks of pixels along the edge of the sub-band, the neighborhood region spills over outside the sub-band. In one embodiment, for the block, an edge extension zone is used to create the block neighborhood. In order to smoothen the signal contours and reduce the dynamic range of the wavelet coefficients along the image edges, in one embodiment, a mirroring scheme is used to create the edge extension zone. Along horizontal edges of the block, columns of pixels in the neighborhood zone are filled with pixels in the same column along the horizontal edge of the block, in a reverse order. Thus, the pixel in the neighborhood zone closest to the edge is filled with the value of the pixel directly abutting it in the same column, and inside the block. This process continues with pixels equidistant from the block boundary, till all the pixels in the current column of the neighborhood zone of the block are filled up. This process is repeated for all columns abutting both horizontal edges of the block. A similar process is repeated with abutting rows along the vertical boundary of the block. For pixels abutting the corner of the block, the value of the pixel in the respective corner of the reference block is replicated.

Once the block neighborhood has been demarcated around the reference block, and the corresponding edge extension zone populated using the scheme outlined above, the actual search routine is performed.

The block of pixels in the current as well as the reference frames that are in the same relative position in homologous sub-bands are used for the ME routine. The block of pixels in the current frame, which is to be matched is called the current block. The region encompassed by the block neighborhood around the reference block can be viewed as being made up of several blocks having the same dimensions as the reference (or current) block.

The metric used to measure the objective numerical difference between the current and any block of the same size in the neighborhood of the reference block is the popular $L_1$, or mean absolute error (MAE) metric. To measure the metric, according to one embodiment, a block of pixels with the same dimensions as the current block is identified within the neighborhood zone. The difference between the absolute values of corresponding pixels in the two blocks is computed and summed. This process is repeated for all such possible blocks of pixels within the neighborhood region, including the reference block itself (block 1104).

One important aspect of the search technique is the order in which the search take place. Rather than using a traditional raster scan, according to one embodiment, an innovative outward coil technique is used. In this modification, the first block in the current neighborhood in the current sub-band of the reference frame to be matched with the current block (of the homologous sub-band in the current frame) is the reference block itself. Once the reference block has been tested, all the blocks which are at a one pixel offset on all sides of the reference block are tested. After the first iteration, all blocks that are at two pixels' offset from the reference block are tested. In this fashion, the search space progressively moves outwards, until all the blocks in the current neighborhood have been tested.

The particular block within the neighborhood region that possesses the minimum MAE is of special interest to the current system (also referred to as a matching block). This is the block of pixels in the reference (previous) frame, which is closest in terms of absolute difference to the current block of pixels in the current frame.

To record the relative displacement of the matching block from the current (or reference) block, in one embodiment, a unique data structure, also referred to as a motion vector (MV) is utilized. The MV of the block being tested contains information on the relative displacement between the reference block (e.g., a block of a previous or future frame) and the matching block (in the current frame). The top-left corner of each block is chosen as the point of reference to track matching blocks. The relative shift between the coordinates of the top-left corner of the reference block and that of the matching block is stored in the motion vector data structure. The motion vectors in the $LL_k$ sub-band are labeled $V_1^o$, while the motion vectors in the three other coarsest sub-bands are labeled $V_2^o$, where o is the orientation (HL, LH and HH), as shown in FIG. 12.

After computing the motion vector, the data is transmitted without context through a baseline binary arithmetic compression algorithm (also referred to herein as the 'pass through mode'). In one embodiment, a hierarchical order is followed while transmitting motion information, especially the motion vector data structure. Motion vector information, both absolute (from coarser levels) and refined (from finer levels), according to one embodiment, has a hierarchical structure. The motion vectors corresponding to blocks that share a parent-child relationship along the same spatial orientation tree have some degree of correlation, and hence may be transmitted using the same context variable.

After the motion prediction process is performed as explained above, according to one embodiment, the pixel values of the matching block in the reference frame are subtracted from the homologous block in the current frame, and the result of each operation is used to overwrite the corresponding pixel in the current block. This difference block, also referred to as the compensated block, replaces the current block in the current frame. This process is referred to as motion compensation (MC).

In order to ensure that the compensation process is applied only to coefficients that contribute substantially to the final reconstructed image in the decoder, according to one embodiment, the previously defined lower threshold (loThres) is used to perform motion compensation only on such coefficients. If it is observed that the compensated coefficient value is lower than the loThres value, according to one embodiment, the compensated coefficient may be quantized down to zero. This ensures that only those coefficients that make some significant contribution to the overall fidelity of the reconstructed frame are allowed to contribute to the final bit rate. The above ME/MC process is repeated over all 2×2 blocks in the four coarsest sub-bands of the current and reference wavelet maps.

Exemplary Refined Motion Prediction

The process is slightly modified for all remaining finer sub-bands in the wavelet maps of the current and reference maps. For all but the four coarsest sub-bands, in one embodiment, a refinement motion prediction scheme may be implemented using an affined transformation over the motion vectors corresponding to the homologous blocks in the coarsest sub-bands, and applying a regular search routine over a limited area in the region around the displaced reference block as shown in FIG. 12.

Due to the parent-child hierarchy between pixels of successively finer sub-bands, the relative position of the reference block in the finer sub-bands is closely related to the reference blocks in the coarsest sub-bands. For example, the descendants of the top-left 2×2 block of pixels in the $HL_3$ sub-band include the 4×4 block of pixels in the top-left corner of $HL_2$, and the 8×8 block of pixels in the top-left corner of $HL_1$, as shown in FIG. 6. Note that the size of a reference block along both dimensions is twice that of a homologous reference block in the previously coarser sub-band. Intuitively, the size of a motion vector in the finer sub-band may be assumed to be twice as the motion vector in a homologous coarser sub-band. This provides a very coarse approximation of the spatial shift of the pixels in the reference block in the sub-band. To further refine this approximation and track the motion of pixels in finer sub-bands more accurately, according to one embodiment, a refined-search-and-match routine is performed on reference blocks in the finer sub-bands.

As a first operation in the refined motion prediction routine, in one embodiment the dimensions of the reference block depend upon the level of the sub-band where the reference block resides. For example, reference blocks in level 2 are of size 4×4, while those in level 3 are of size 8×8, and so on. In other words, the size of a reference block along both directions is twice as the reference block in the immediately preceding (coarser) sub-band. In one embodiment, a block with the same or similar dimensions as the reference block in a particular level and shifted by a certain amount along both cardinal directions is identified.

The amount of displacement depends on the level where the reference block resides, as shown in FIG. 12. For example, referring to FIG. 12, in level 2 sub-bands, the approximate displacement is $2*V_k^o$, where, $V_k^o$ is the motion vector for a homologous reference block in the coarsest (level 1) sub-band. Thus, the new reference block is displaced by $2*V_k^o$ from the original reference block. A search region, which is identical to the neighborhood zone around the reference block defined earlier, is defined around the new reference block, along with edge extension if the block happens to abut the sub-band edge. The depth of the neighborhood zone depends on the level of decomposition. In one embodiment, it has been set at 4 pixels for level 2 sub-bands, and 8 for level 3 sub-bands, and so on.

For sub-bands in any intermediate levels, the refined-search-and-match routine is implemented in a manner that is similar or identical to the search-and-match routine for the level 1 (coarsest) sub-bands, as described above. The refined motion vector, labeled as $\Delta_k^o$, where k=2n–1, n=total level of decomposition and l=current level of decomposition, is transmitted in a manner similar to the motion vectors of coarser sub-bands (see FIG. 12). The (resultant) corrected motion vector, $V_k^o$, pointing to the net displacement of the matching block is given by adding the approximate (scaled) motion vector, $2*V_{k/2}^o$, and the refinement vector, $\Delta_k^o$.

For sub-bands of the finest level, the approximate motion vector (to account for the doubling of the dimensions of the reference block) is given by $V_k^o+(2*V_{k/2}^o)$. A block that is displaced from the original reference block by the approximate motion vector is then used as the new reference block. The depth of the neighborhood zone is set at twice the size as that set in the immediately coarser level, around this block. The new refined motion vector, $\Delta_{2*k}^o$, thus obtained is transmitted in a manner similar to that of coarser levels (see FIG. 12).

The motion compensation (MC⁻) routine for the refined motion prediction algorithm performed on the finer sub-bands is similar or identical to the process outlined for the coarsest sub-bands. The matching block, pointed to by the refined motion vector is subtracted pixel-by-pixel from the current block (in the homologous position in the current frame), and the difference is overwritten in the location occupied by the current block. This block is now called the compensated block (as described above for coarser sub-bands).

After all the current blocks in the current frame have been compensated, the new frame is called the compensated frame. This compensated (difference) frame (also called the predicted frame) is now source and arithmetic coded using the source entropy/arithmetic coder, and the bit stream is transmitted over the transmission channel (e.g., blocks 403-405 of FIG. 4A).

The source coding and motion compensation feedback loop for predicted frame is similar to the process employed for Intra-frames, with some minor modifications. It is well known that the statistical distribution of coefficient values in a predicted-frame is different from the one found in Intra-coded frames. In case of Intra coded frames, it is assumed that the energy compaction of the wavelet filter ensures superior energy compaction. This ensures that a majority portion of the energy is concentrated in the four coarsest sub-bands. However, during the entire setup, the data has the non-deterministic statistical properties of real time visual signals, such as video sequences. But in the case of predicted frames, only the spatially variant difference values of the pixels are stored, and these coefficients lack the entropy of a real video clip. Hence, the superior energy compaction of the predicted wavelet map cannot be taken for granted.

In one embodiment, for an intra coded map, going along a particular orientation tree, the coarsest sub-band has the largest mean and variance of coefficient values, and these statistics decrease along a logarithmic curve towards finer levels. Such a "downhill" contour maintains the high level of energy compaction in the wavelet map. This "top-heavy"distribution helps in the high coding efficiency and gain of the source coder. However, the first and second statistical moments of these sub-bands are not so intimately related in predicted wavelet maps. To simulate the "nearly-logarithmic curve" relationship in the predicted maps, according to one embodiment, the wavelet coefficients of the finer sub-bands in a predicted map may be scaled down from their original values. This forces the contour plot into a more "logarithmic" fit, thereby simulating the similar statistical distribution of wavelet coefficients that makes the compression of intra coded wavelet maps so efficient. According to one embodiment, this process of scaling is reversed in the decoding process. According to one embodiment, scaling factors of 8, 16 and 32 for the finest sub-bands (other than the $LL_k$ sub-band) along a particular tree orientation for a three level decomposition.

In one embodiment, a group-of-frames (GOF) is defined as a temporally contiguous set of frames, beginning with an intra-coded frame, and succeeded by predicted (B or P or otherwise) frames. At the end of a GOF, an intra-coded frame signals the beginning of a new GOF.

An important facet of rate control is to ensure that intra-coded frames are introduced only when it is needed, due to their inherently higher coding rates. In one embodiment, the two events that warrant the introduction of intra-coded frames is a fall in the average frame PSNR below acceptable levels and/or a change in scene in a video clip. Due to the accurate motion prediction routine used by the system, the average PSNR of the frame less likely falls below a previously accepted threshold (thereby ensuring good subjectively quality throughout the entire video sequence).

Since most data processing and heuristic decisions are made in a multi-resolution domain, a change in scenery is also detected based on the distribution of pixel values in the coarsest ($LL_k$) sub-band. As a pre-processing operation prior to motion prediction and source/entropy coding, the coarsest sub-bands of two frames on which the motion prediction routine is to be performed are compared.

In one embodiment, the absolute difference of homologous pixels in the $LL_k$ sub-band is computed and compared with respect to a threshold. This threshold is determined upon experimentation on a wide range of video clips. In a particular embodiment, a value of 500 is suitable for most purposes. This absolute differencing operation is performed on all coefficients of the coarsest sub-band, and a counter keeps track of the number of cases where the value of the absolute difference exceeds the threshold. If the number of pixels in whose case the absolute difference exceeds the threshold is above or equal to a predetermined value, it can be assumed that there has been such a drastic change in the scenery in the video frame, so as to warrant an introduction of an intra-coded frame, thereby marking the end of the current GOF, and the beginning of a new one. The numeric level, hereby labeled as the scene change factor (SCF) that determines a scene change is a matter of experimentation. In one embodiment, a value of 50 is suitable for most cases.

In one embodiment, a technique is employed to ensure that only those matching blocks (within a sub-band) that satisfy certain minimum and maximum threshold requirements are compensated and coded. This technique is called adaptive threshold. In one embodiment during the actual block matching routine, the first block to be compared with the current block is the reference block. For all other blocks in the neighborhood zone, the MAE of this block is compared with the MAE of the reference block against a threshold. If the difference in the values of the MAE of these two blocks is less than a threshold value, this match is discarded, and the reference block continues to be regarded as the best match.

The threshold value may be determined by experimentation, and is different for different levels of the wavelet tree structure. At the coarser level (higher sub-bands) the coefficients are the average values while at the finer level (lower sub-bands) the coefficients are the difference values. Average values are larger than the difference values. Hence for $LL_k$ sub-band the threshold value is higher than other sub-bands. All the sub-bands at given decomposition levels have the same quantization value and the value reduces as we go down the decomposition levels. Once a match has been found, according to one embodiment, the energy of the current block (in the current frame) may be compared with the energy of the compensated block (obtained by differencing homologous pixels of the current block in the current frame and the matching block in the reference frame). The energy in this case is a simple first order metric obtained by summing the coefficient values of the particular compensated block. If this energy value is greater than the corresponding energy value of the current block, the compensated block is discarded and the current block is used in its place in the compensated (residual) frame. Similar to the previous threshold case, according to one embodiment, the value of the current threshold level may be determined through extensive experimentation, and is different for the various levels of the wavelet pyramid.

Exemplary Motion Prediction Modes

The motion prediction routine used in certain embodiments is referred to herein as bi-directional multi-resolution motion prediction (B-MRMP). In one embodiment, motion is estimated from a previous as well as succeeding frame. The temporal offset between past, current and future frames used for motion prediction is a matter of conjecture. In one embodiment, a temporal offset of one is usually applied for best results. In one embodiment, frames are read and wavelet transformed in pairs. In such a scenario, three popular sequence modes are possible.

In the first mode, also referred to as BP mode, the first frame in the pair is the bi-directionally predicted frame, where each block in each sub-band of this frame, which undergoes the motion prediction routine is tested against a homologous block in both a previously coded (reference) frame, as well future (P or otherwise) frame. In one embodiment, the frame data is read and wavelet transformed in the natural order. However, the (succeeding) P frame is motion predicted before the B frame. The P frame is predicted by applying the motion prediction routine using the second frame of the last pair of frames (e.g., the reference frame). The frame is then reconstructed and compensated using the motion prediction techniques, to recover a lossy version of the frame. Each block in the B frame is now motion predicted with homologous blocks from both the (past) reference frame as well as the (future) P frame. If estimation/compensation with the reference block from the reference frame gives a lower energy compensated block, the particular block is compensated using the reference block of the (past) reference frame, or else, compensation is carried out using the reference block of the (future) P frame.

In the finer sub-bands of the B frame, the decision to use one of the two frames (past reference or future P) for compensation is based on the frame used for this purpose in the parent blocks in the four coarsest sub-bands.

While recording and transmitting the motion information of the B frame, an array stores the identity of the frame (past reference or future P) used in the compensation process, and using a 2-bit alphabet. This information for all blocks in the frame is transmitted with context over the channel prior to other motion information. The advantage of using B frames is that they do not need compensation and reconstruction in the motion prediction feedback loop, since they are less likely used as reference frames to predict future frames. Thus this routine passes through the feedback reconstruction loop in the encoding process for half the non-intra-coded frames than in other systems, thereby saving a considerable amount of processing time.

In the second mode, also referred to as PI mode, the first frame in the pair is predictive coded using the second frame of the previous pair of frames as reference. The intra-coded frame in the latter part of this pair is used as reference for the next pair of the frames.

In the PI mode, the first frame is an intra-coded frame and is used as reference for the (unidirectional) motion prediction of the second frame in the pair. Once the second (P) frame has been compensated for, it is reassigned as the new reference frame for the next pair of frames.

In another embodiment, the motion prediction is performed using a single predicted frame, also referred to as uni-directional multi-resolution motion prediction (U-MRMP mode). In this scheme, all the operations outlined previously for B-MRMP are performed using a single (previous) predicted frame, known simply as the P frame. Since, only one frame is needed to be read at a time, this technique requires less latency time, though the motion prediction is not as accurate. Since all non-intra-coded frames are predicted from a previous (I or P) frame, there is no need to send a stream of mode bits, as described above.

In another embodiment, the motion compensation ($MC^-$) scheme may be replaced with a motion block superposition (MBS). In the MBS scheme, the motion estimation is performed as described above. However, the arithmetic encoding scheme is highly inefficient in coding predicted (error) maps (B and P). Due to the skewed probability distribution of coefficients in B and P frames, they do not satisfy the top-heavy tree structure assumptions made in the case of arithmetic coding. This results in several of the large coefficients being interspersed in the finer sub-bands, causing the iterative mechanism of arithmetic coding to loop through several bit planes before these isolated coefficients have been coded for higher fidelity.

In one embodiment, one way to resolve this problem is to avoid working on error maps altogether. In this scheme, the arbitrary GOF size is replaced by a GOF of fixed size. In certain embodiments, the number of frames in the GOF may be equal to the number of frames per second (e.g., a new GOF every second). In case of rapid scene changes, where an intra-coded frame may be inserted within the 1-second duration between two intra-coded GOF end-markers (to mark the beginning of a new scene), a new GOF is defined from this new I frame. After the motion estimation routine has determined the spatial location of the matching block relative to the reference block, according to one embodiment, the coefficient values of the current block (in the current frame) are replaced with the homologous pixels of the matching block in the reference frame. This saves time by not computing the difference of the two blocks, and also maintains the general statistics of an intra- coded frame. In effect, this results in the blocks of the first intra-coded frame in the current GOF being moved around within a limited region, like a jig-saw puzzle, with the motion being represented using only the corresponding motion vectors. In this scheme, only the motion vectors need to be transmitted, and the predictively coded maps are no longer source coded, since the blocks in each predictively coded frame is essentially made up of blocks translated and lifted from the first intra-coded frame of the current GOF. These operations are performed on all three maps of each B or P frame.

Once the superposition from the reference to the current frame is completed (to create the Superimposed Frame, in lieu of the Compensated Frame described above), this acts as the reference frame for the future frames. Since the actual pixel values in the first I frame of the current GOF are simply translated around their position throughout the entire process, it may not need to encode the superimposed frame using arithmetic coding and transmit the bits to the decoder. Thus, the new system saves time and bandwidth by not encoding and transmitting bits from the superimposed frames.

In another embodiment of BMS, only the four coarsest sub-bands of the luma (and/or chroma) map(s) of the predictively coded frames are source encoded using arithmetic coding. This is done by duplicating these four sub-bands in an n-level sub-band map (similar to the normal maps), and padding all other sub-bands with zeros. Motion estimation (ME) and motion compensation (MC⁻/MC⁺) are performed, as described above, and the compensated frame is encoded using arithmetic coding. This ensures greater reliability in tracking motion compared to the previous embodiment, but at the cost of higher bit rates.

As described above, the choice of the modes of motion prediction is a matter of open conjecture, and some diligent experimentation. In one embodiment, a threshold, also referred to as the motion information factor (MIF), may be used to decide on the mode in which the current and future frames are to be temporally coded.

In one embodiment, two independent thresholds are used to compute the MIF. Coefficients in the sub-bands in the wavelet map may be used for this purpose. The decision tree to classify blocks based on the average amount of motion is based on the segregation of the coefficients into three categories. For blocks whose total energy after compensation is greater than the energy of the original current block itself, the corresponding motion vector co-ordinates are set to a predetermined value, such as, for example, a value of 127. The other two categories of blocks have motion vectors with both coordinates equal to a value other than the predetermined value. For convenience, these blocks are labeled as NC (non-compensated), Z (zero) and NZ (non-zero) respectively.

The first threshold is set for the four coarsest sub-bands in the wavelet map. We denote the total number of NC blocks by the factor $\alpha$ and the total number of NC and Z blocks by the factor $\beta$. In one embodiment, if $\alpha$ is less than 10% of the value of $\beta$, then the particular frame is repeated. Otherwise, motion prediction (B-MRMP) is performed.

A similar test with the same test parameters ($\alpha$ and $\beta$) is performed on the remaining finer sub-bands. In one embodiment, if $\alpha$ is less than 10% of $\beta$, motion block substitution (MBS) is performed. Otherwise, motion prediction (B-MRMP) is performed.

The threshold factor and the number of sub-bands to be used in either test is a matter of conjecture and diligent experimentation. In one embodiment, 4 (out of a possible 10) sub-bands are used for the first test and the remaining 6 are used for the second test, with a threshold factor of 10% in either case.

Alternative Motion Prediction Schemes

Figure 10A:
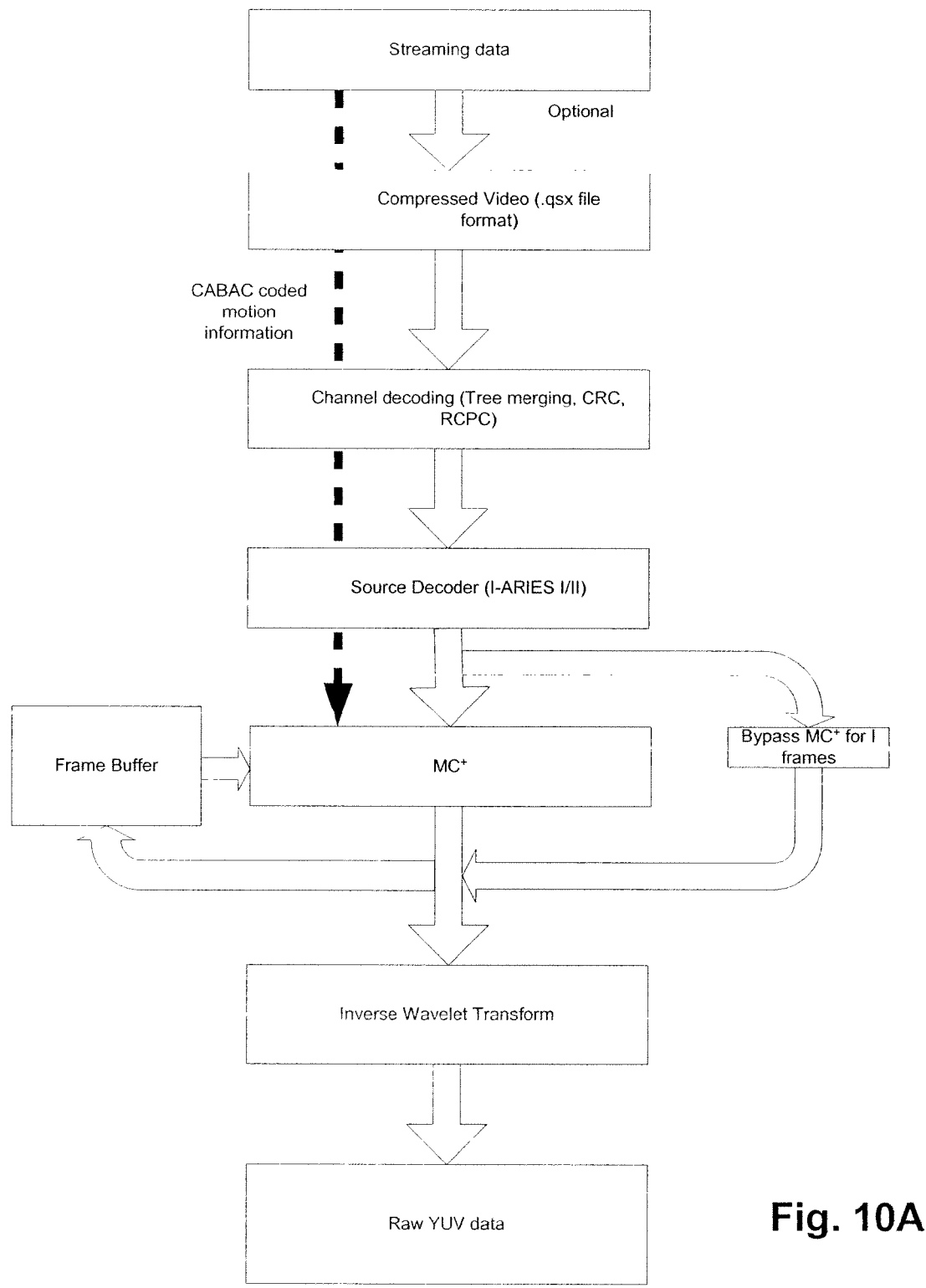
Figure 10B:
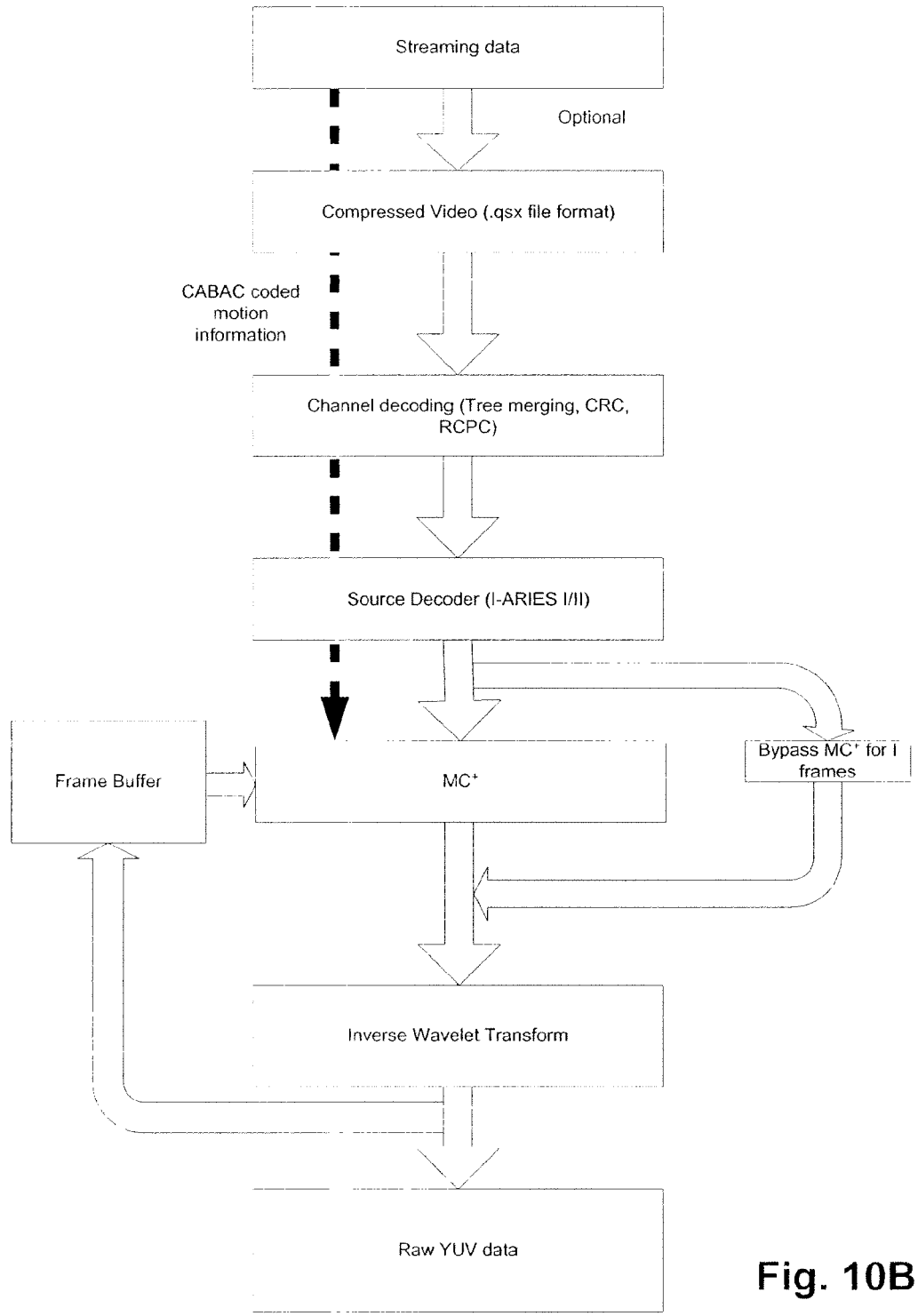

In another embodiment, a full search routine of the pixel (spatial) map is introduced prior to the wavelet transformation block, in order to predict and track motion in the spatial domain and thereby exploit the temporal redundancy between consecutive frames in the video sequence, as shown in FIGS. 9B and 10B. In one embodiment, a 16×16 block size is best suited for tracking real-world global and local motion. This includes, but is not limited to, rotational, translational, camera-pan, and zoom motion. Hence, blocks of this size are referred to as standard macroblocks.

In one embodiment, a unidirectional motion prediction (U-MP) is employed to predict motion between consecutive frames using a full search technique. In this embodiment, the frame is divided into blocks with height and width of the standard macroblock size (16×16). To prevent any inconsistencies along the frame boundaries, frame dimensions are edge extended to be a multiple of 16. To fill the pixels in the edge extended zones so created, a standard and uniform technique is applied across all frames. The edge extended zone can be filled with the pixels values along the edge of the actual image, for instance, or may be padded with zeros throughout. A variety of techniques may be utilized dependent upon the specific configurations.

Figure 13:
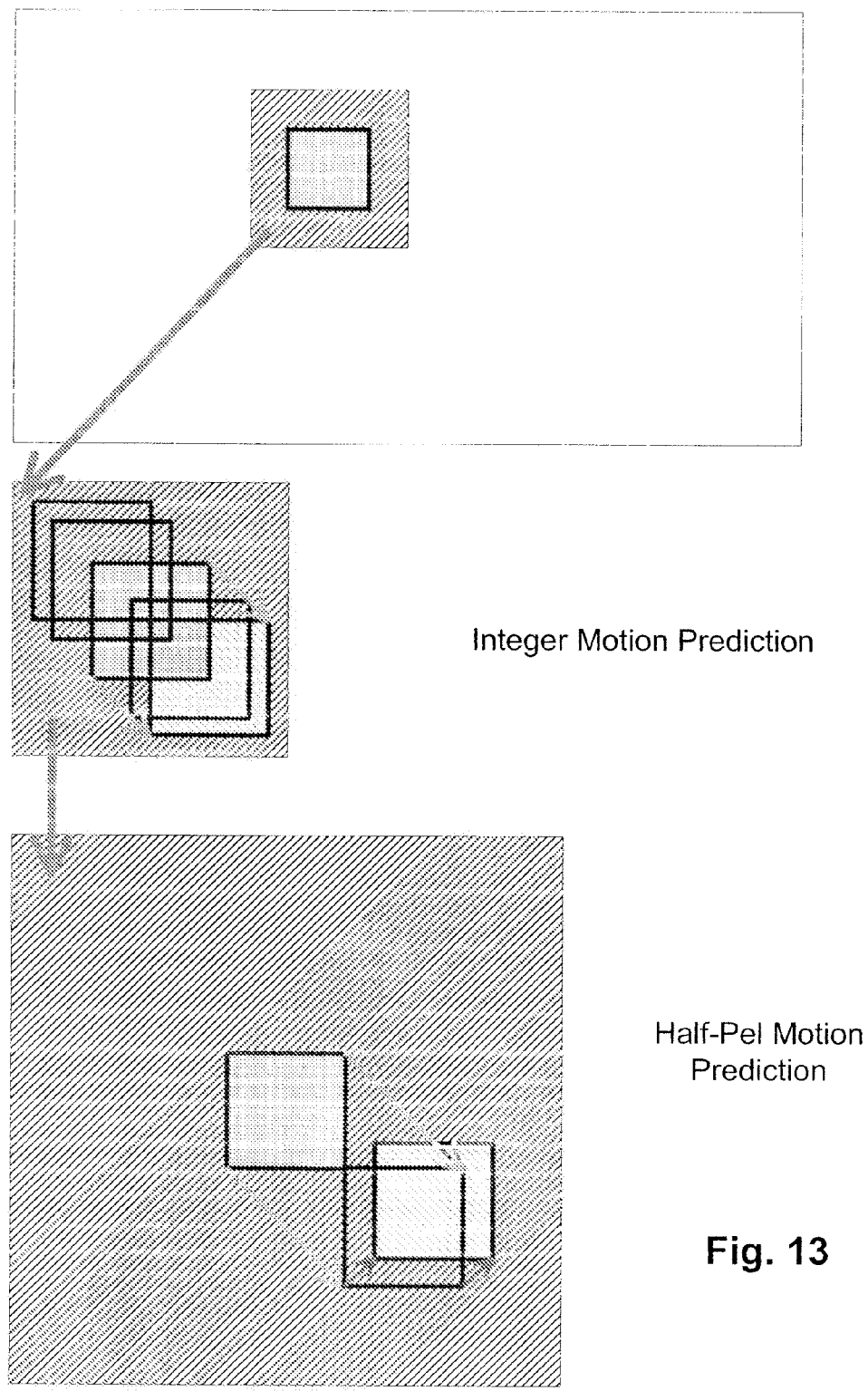

Once the frame is divided into blocks of size 16×16, the U-MP routine is applied to all such blocks in a raster scan sequence. For each block, a neighborhood zone is defined around the edges of the macroblock, as shown in FIG. 13. The depth of the neighborhood zone is chosen to be equal to 15 pixels in every direction. Hence, each macroblock to be processed using U-MP is padded with a 15 pixel neighborhood zone around it from all directions.

For macroblocks along the edge of the image map, the neighborhood zone may extend over to the region outside the image map. In such cases, the neighborhood zone for the macroblock uses pixels from the edge extended zone.

The U-MP routine may be split into five basic operations. In the first operation, known as selective motion prediction, in one embodiment, a threshold is set to determine which pixels, or sets thereof, need to be compensated in the U-MP process. In one embodiment, each pixel in the reference frame is subtracted from the homologous pixel in the current frame, thereby generating a difference map. Each pixel in the difference map is then compared against a pre-determined threshold. The value of the threshold is a matter of conjecture and rigorous experimentation. If the difference value at the current pixel position is above the threshold, the pixel is marked as active; else it is marked as inactive. After all the pixels in the reference frame are checked, a count of the number of such active pixels in each 16×16 pixels in the reference frame is recorded. If the number of active pixels in the macroblock is above a pre-determined threshold, the macroblock is marked as active; else it is marked as inactive. The value of the threshold is a matter of conjecture and rigorous experimentation.

The second operation in the U-MP process is the unidirectional motion prediction (U-MP) operation. In one embodiment, a modification of the traditional half-pel motion prediction algorithm is performed. In this modification, each frame is interpolated by a factor of two, leading to a search area that is four times the original image map. As described above, the previous embodiment, the previous frame, known as the reference frame, is used as the reference for predicting and tracking motion. The current frame (known simply as the current frame) is used as the other basis of comparison. The homologous blocks in these two frames that are compared are called the reference block and the current block respectively, as shown in FIG. 13.

Figure 14:
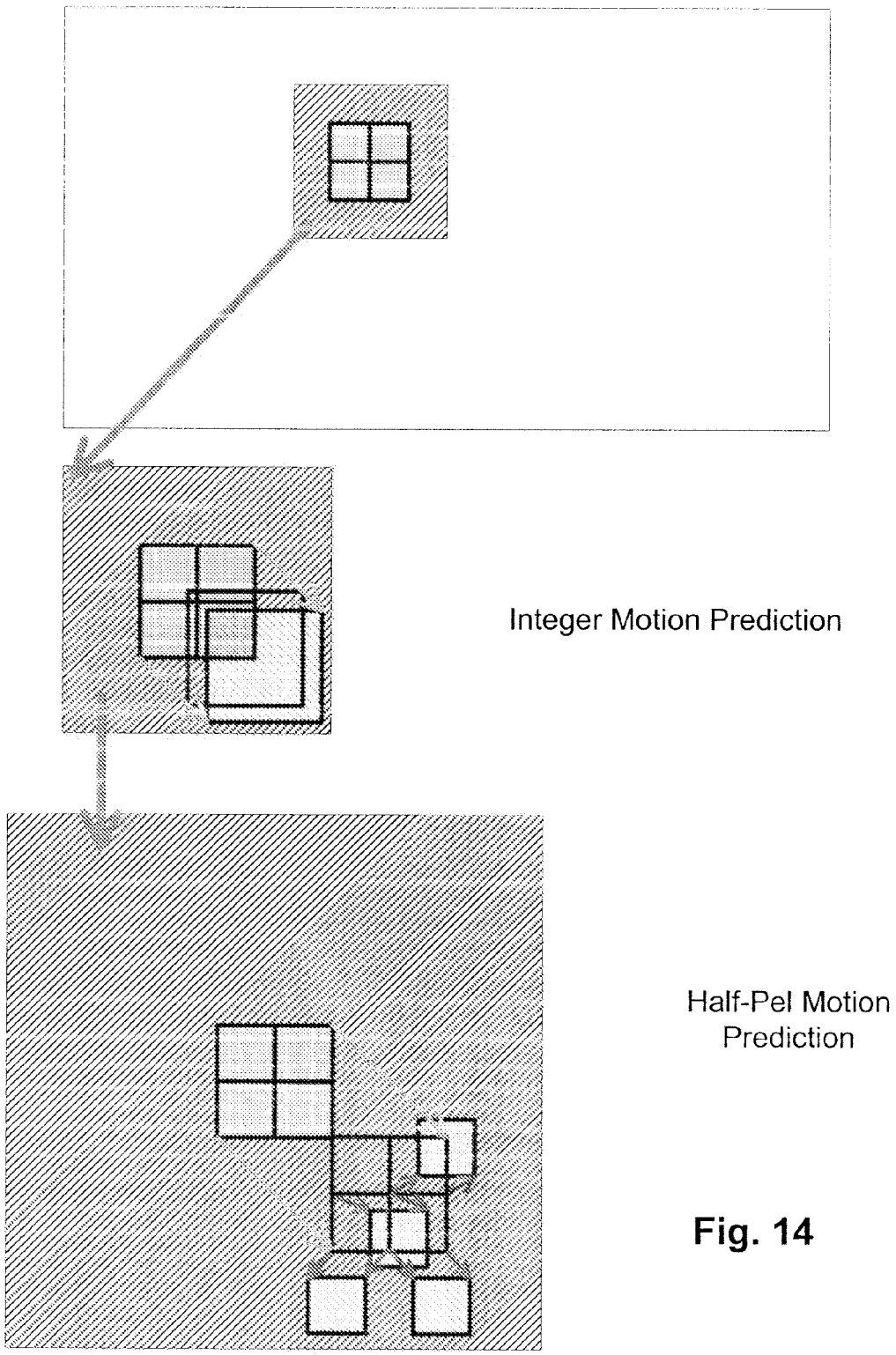

In another embodiment of the motion prediction routine, the non-integer-pel motion interpolation scheme may be further modified to perform a form of quarter-pel motion prediction as shown in FIG. 14. In this modification, the luma map of the current and reference frames are interpolated by a factor of four along both the cardinal directions, such that the effective search area in the search-and-match routine is increased by a factor of sixteen. In both aforementioned forms of the interpolation scheme, the choice of the interpolation mechanism is a matter of conjecture and rigorous experimentation, which includes, but is not restricted to, bi-linear, quadratic and cubic-spline interpolation schemes. The tradeoff between accurate prediction of the interpolated coefficients and speed of computation is a major deciding factor for the choice of scheme.

In the second operation, three tests are performed to determine the optimal direction of motion in a particular block of pixels in the current frame. Initially, in the non-displaced motion prediction operation, in one embodiment, each macroblock in the current frame is subtracted pixel-by-pixel from the homologous macroblock in the reference frame. This generates the non-displaced compensated block. In the next operation, an integer search (see FIGS. 13 and 14) is performed on every 16×16 macroblock of the current frame. In this routine, the pixels of the current macroblock are superimposed over every set of pixels of the same size as the current block in the neighborhood zone around the reference block. The metric employed for comparing these two sets of pixels, as in the previous embodiment, is the $L_1$ (sum of absolute differences–SAD) metric. Starting with the reference block, the SAD is computed for all 16×16 blocks in the neighborhood zone of the reference block, and the position of the block with the lowest value of SAD is labeled as a matching block.

The relative position between the matching block and the reference block is recorded using a unique data structure known as the motion vector for the current reference block. In the next operation, a half-pel search is performed on every 16×16 macroblock of the current frame (see FIG. 13). In this mode, the motion vector obtained for a particular macroblock in the integer search mode is doubled, and a refined search is performed. The depth of the refined search area is one pixel across in all directions. This operation helps in detecting motion which is less than or equal to half a pixel in all directions. The resultant motion vector is obtained by summing the scaled motion vector obtained in the integer search and the refined search modes. This and the corresponding SAD value are recorded for future mode selection (see FIG. 13).

After recording the motion vectors and the value of the SAD for the corresponding macroblocks in the current frame, each macroblock is split into four blocks of size 8×8, and half-pel search is performed on each of the four blocks (see FIG. 14). The block (of dimension 8×8) offset from the current block (being tested for motion prediction) by a distance along both cardinal directions equal to the corresponding components of the motion vector obtained as outlined above, is used as a basis for a refined search routine, with a search area of 1 pixel around the block. This is a modification of the refined search technique, with a refined search area of one pixel across, as described above. The set of four resultant motion vectors, obtained by summing the scaled motion vector obtained in the integer search and refined search modes, and their corresponding SAD values are recorded for mode selection later on (see FIG. 14).

In another embodiment, a more refined scheme is implemented for smaller moving objects in the global motion field. In this scheme, each block of 8×8 within the current macroblock is further split into four blocks of 4×4, and the above technique of scaling and refined-search outlined above may be repeated for all possible search areas of dimensions 4×4, 4×8 and 8×4 pixels. The SAD values obtained from the refined motion estimation routines outlined in this paragraph are also tabulated for future mode selection.

In the third operation in U-MP according to one embodiment, different weights are applied to the SAD values obtained from the three different modes described above. Since the SAD (and the corresponding motion vector) from the non-displaced motion prediction operation contribute the least to any addition to the cumulative transmission rate, the motion vectors corresponding to this mode is given the lowest weight (of value zero), and hence the highest priority; the mode of the block is labeled as OMV. Similarly, increasing weights (and lower priorities) are conferred upon the SAD values and motion vectors obtained from the 16×16 integer/half-pel search and 8×8 half-pel search modes, respectively. The blocks are labeled 1MV (see FIG. 13) and 4MV (see FIG. 14), respectively. The weights are imposed by comparing the SAD values against some predetermined threshold. The value of the threshold, in each of the three cases outlined above, is a matter of conjecture and rigorous experimentation. This is done to ensure that a mode with higher rate is chosen for a particular macroblock, only when the advantage so obtained, in terms of higher fidelity (and lower SAD), is fairly substantial.

Figure 15:
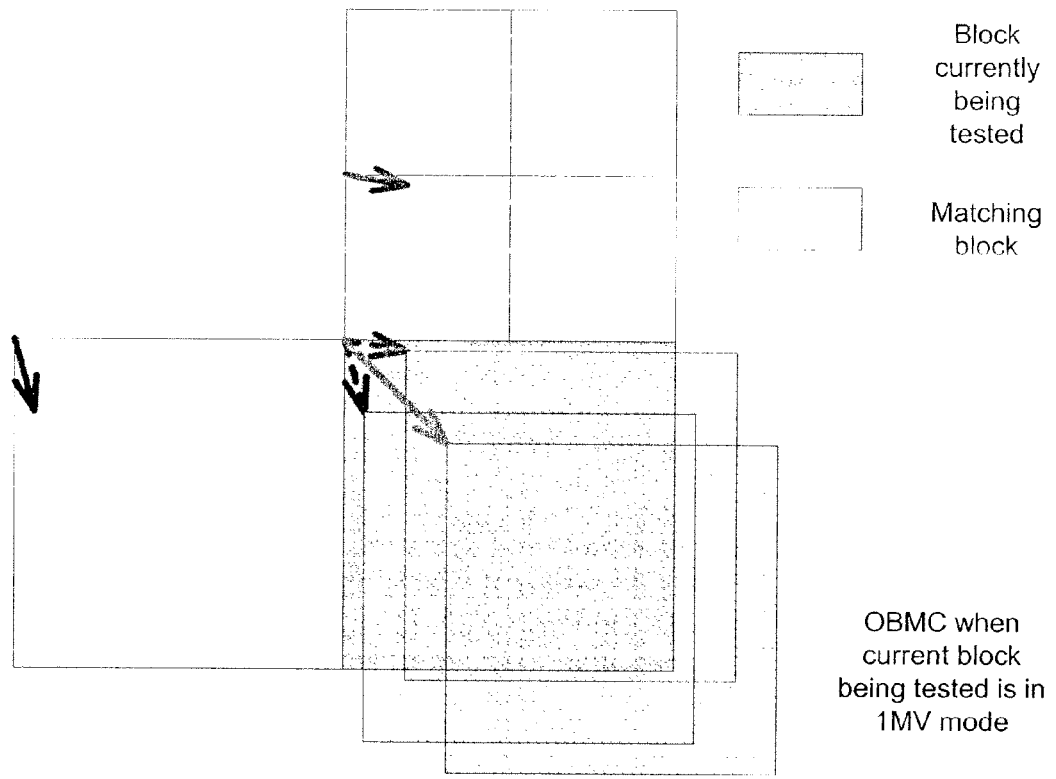
Figure 15:
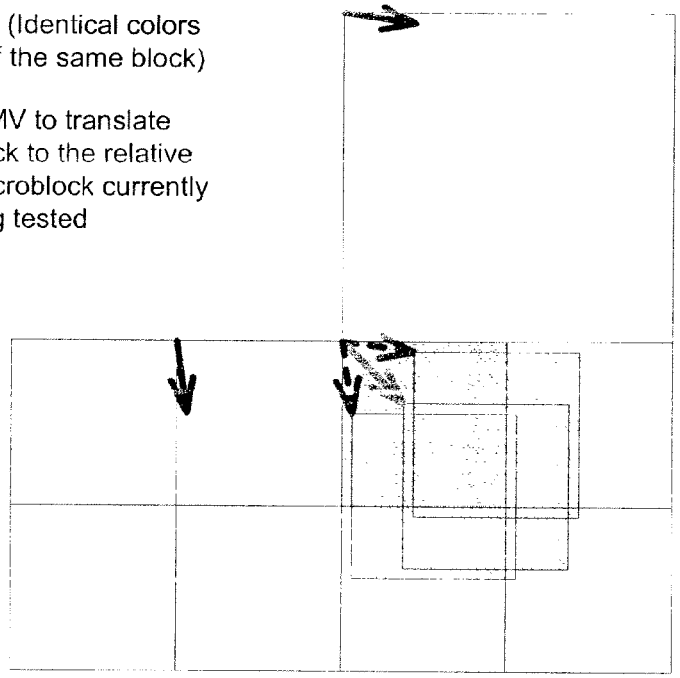

In the fourth operation of U-MP, according to one embodiment, overlapped block matching/compensation (OBMC) is performed on each 16×16 macroblock of the reference frame as shown in FIG. 15. In this operation, a displaced frame difference (DFD) algorithm is implemented, using the techniques described above. However, in one embodiment, the choice of the Matching Block is a function of the motion vectors of the reference block currently being tested, as well as its abutting neighbors, as shown in FIG. 15.

Consider the instance when the reference block currently being tested is of mode 1MV, and the blocks directly above and to its left and abutting it are of mode 1MV each. In such an instance, according to one embodiment, the motion vectors from all three blocks are translated to any one corner of the reference block being tested (with no preference being given to any particular corner, though this choice should be consistent throughout the compensation procedure for that block), and the corresponding matching blocks are determined. The dimensions of all three matching blocks should be equal to the dimensions of the reference block (see FIG. 15). In the current embodiment, homologous pixels from all the matching blocks, so determined, are summed with different weights, and then differenced with the homologous pixel in the current block (in the current frame). The difference values are overwritten on the corresponding pixel positions in the current block. This difference block is labeled as the compensated block.

In the instance when the reference block currently being tested is of mode 4MV, according to one embodiment, the matching block is of size 8×8. In this instance, each of the four 8×8 blocks carved out of the original 16×16 reference block is used to perform OBMC. If the block directly abutting any one of the 8×8 blocks is of mode 1MV, its single motion vector is used in the OBMC process. If the abutting block is of mode 4MV, only that 8×8 block of such an abutting block, which shares an entire line of pixels as the border with the 8×8 block in question (in the reference block being tested) is used (see FIG. 15).

The weighting function applied to the pixels or sets thereof in the reference block currently being tested, as well as the function applied to the pixels or sets thereof in the blocks abutting the reference block can be determined using a process of rigorous experimentation.

As a final operation in U-MP, a residual frame is generated, as a direct outcome of the OBMC operation described above. Using the DFD routine, each block (8×8 or 16×16) is differenced, and the pixel values are overwritten onto the corresponding pixel positions in the current block, thereby generating the residual block. Once all the blocks in the current frame have been tested, the resultant frame is labeled as the residual frame.

For every macroblock (of size 16×16) which has a motion vector of size zero, the SAD may be compared against a predetermined threshold. If the SAD is below the predetermined threshold, the particular macroblock is marked as a non-compensated macroblock (NCMB). If four such NCMBs are found adjacent to each other in a 2×2 grid array arrangement, this set of four blocks is jointly labeled as a non-coded block (NCB).

The decoder decodes the encoded bit stream has the reverse signal flow as the encoder. The relative order of the various signal processing operations are reversed (for example, the wavelet reconstruction block, or I-DWT comes after the source/entropy decoder, inverse arithmetic coding). Within each block, the flow of input data is reversed relative to the encoder, and the actual logical and mathematical operations are also reversed.

The decoder however lacks the complexity of the encoder, in that the Motion Compensation (MC$^+$) routine in the decoder is a relatively simple addition process, and does not involve the computationally intensive search-and-difference routine of the motion estimation/compensation (ME/MC$^-$) operation. The motion vector information for a particular block of pixels (of any arbitrary sub-band at any arbitrary level of resolution) is used to mark the current block under consideration, and the residual frame is updated (or 'compensated') by simply adding the values of the homologous pixels from the residual block to the current block as shown in FIGS. 9B and 10B.

Thus, methods and apparatuses for compressing digital image data are described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, the present invention is not described with reference to any particular programming language. It will be appreciated that a variety of programming languages may be used to implement the teachings of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
performing on a computer a wavelet transform on each pixel of a frame to generate a plurality of wavelet coefficients representing each pixel in a frequency domain;
iteratively encoding on a computer wavelet coefficients of a sub-band of the frame obtained from a parent sub-band of a previous iteration into a bit stream based on a target transmission rate, wherein the encoded wavelet coefficients satisfy a predetermined threshold based on a predetermined algorithm while the wavelet coefficients that do not satisfy the predetermined threshold are ignored in the respective iteration; and
tracking spatial shift of one or more coefficients between frames.

2. The method of claim 1, further comprising transmitting at least a portion of the bit stream to a recipient over a network according to the target transmission rate, wherein the transmitted bit stream when decoded by the recipient, is sufficient to represent an image of the frame.

3. The method of claim 2, wherein iterative encoding is performed according to an order representing significance of the wavelet coefficients.

4. The method of claim 3, wherein the order is a zigzag order across the frame such that significant coefficients are encoded prior to less significant coefficients in the bit stream, wherein when a portion of the bit stream is transmitted due to the target transmission rate, at least a portion of bits representing the significant coefficients are transmitted while at least a portion of bits representing the less significant coefficients are ignored.

5. The method of claim 3, wherein an amount of data in the bit stream is determined based on the target transmission rate, which is determined based on a communications bandwidth associated with a recipient over the network.

6. The method of claim 5, wherein the bit stream includes significance, sign, and bit plane information associated with the encoded coefficient based on a location of encoded coefficient within a respective sub-band.

7. The method of claim 6, further comprising maintaining separate contexts to represent the significance, sign, and bit plane information respectively for different decomposition levels, wherein content of the contexts are compressed into the bit stream for transmission.

8. The method of claim 3, further comprising decrementing a predetermined threshold of a current iteration by a predetermined offset to generate a new threshold for a next iteration.

9. The method of claim 8, wherein the predetermined offset includes up to a half of the predetermined threshold of the current iteration.

10. The method of claim 8, wherein an encoding area for the next iteration is larger than an encoding area of the current iteration by a factor determined based on the predetermined offset.

11. A machine-readable medium having executable code to cause a machine to perform a method, the method comprising:
performing on a computer a wavelet transform on each pixel of a frame to generate a plurality of wavelet coefficients representing each pixel in a frequency domain;
iteratively encoding on a computer wavelet coefficients of a sub-band of the frame obtained from a parent sub-band of a previous iteration into a bit stream based on a target transmission rate, wherein the encoded wavelet coefficients satisfy a predetermined threshold based on a predetermined algorithm while the wavelet coefficients that do not satisfy the predetermined threshold are ignored in the respective iteration; and
tracking spatial shift of one or more coefficients between frames.

12. The machine-readable medium of claim 11, wherein the method further comprises transmitting at least a portion of the bit stream to a recipient over a network according to the target transmission rate, wherein the transmitted bit stream when decoded by the recipient, is sufficient to represent an image of the frame.

13. The machine-readable medium of claim 12, wherein iteratively encoding is performed according to an order representing significance of the wavelet coefficients.

14. The machine-readable medium of claim 13, wherein the order is a zigzag order across the frame such that significant coefficients are encoded prior to less significant coefficients in the bit stream, wherein when a portion of the bit stream is transmitted due to the target transmission rate, at least a portion of bits representing the significant coefficients are transmitted while at least a portion of bits representing the less significant coefficients are ignored.

15. The machine-readable medium of claim 13, wherein an amount of data in the bit stream is determined based on the target transmission rate, which is determined based on a communications bandwidth associated with a recipient over the network.

16. The machine-readable medium of claim 15, wherein the bit stream includes significance, sign, and bit plane information associated with the encoded coefficient based on a location of encoded coefficient within a respective sub-band.

17. The machine-readable medium of claim 13, wherein the method further comprises decrementing a predetermined threshold of a current iteration by a predetermined offset to generate a new threshold for a next iteration.

18. The machine-readable medium of claim 17, wherein the predetermined offset includes up to a half of the predetermined threshold of the current iteration.

19. The machine-readable medium of claim 17, wherein an encoding area for the next iteration is larger than an encoding area of the current iteration by a factor determined based on the predetermined offset.

20. A data processing system, comprising:
a capturing device to capture one or more frames of an image sequence; and
an encoder coupled to the capturing device, for each frame, the encoder configured to perform a wavelet transform on each pixel of a frame to generate a plurality of wavelet coefficients representing each pixel in a frequency domain, and iteratively encode wavelet coefficients of a sub-band of the frame obtained from a parent sub-band of a previous iteration into a bit stream based on a target transmission rate, wherein the encoded wavelet coefficients satisfy a predetermined threshold based on a predetermined algorithm while the wavelet coefficients that do not satisfy the predetermined threshold are ignored in the respective iteration; and
an element tracking spatial shift of one or more coefficients between frames.

21. A computer implemented method, comprising:
receiving at a computerized mobile device at least a portion of a bit stream having at least one frame, wherein the mobile device includes one of Pocket PC based PDAs and smart phones, Palm based PDAs and smart phones, Symbian based phones, PDAs, and phones supporting at least one of J2ME and BREW;
iteratively decoding at the device the at least a portion of a bit stream to reconstruct an image of the at least one frame and;
tracking spatial shift of one or more coefficients between frames.

22. The method of claim 21, wherein iteratively decoding comprises generating significance, sign, and bit plane information associated with an encoded coefficient based on a location of encoded coefficient within a respective sub-band.

23. The method of claim 22, further comprising maintaining separate contexts to represent the significance, sign, and bit plane information respectively for different decomposition levels, wherein content of the contexts are updated from the received bit stream.

24. The method of claim 22, wherein iterative decoding is performed according to an order representing significance of the wavelet coefficients.

25. The method of claim 22, further comprising decrementing a predetermined threshold of a current iteration by a predetermined offset to generate a new threshold for a next iteration.

26. The method of claim 25, wherein the predetermined offset includes up to a half of the predetermined threshold of the current iteration.

27. method of claim 25, wherein an decoding area for the next iteration is larger than the decoding area of the current iteration by a factor determined based on the predetermined offset.

28. The method of claim 22, where in the amount of data to be decoded from the bit stream is determined based on the required quality of the reconstructed frame.

29. The method of claim 24, wherein the order is a zigzag order across the frame such that significant coefficients are decoded prior to less significant coefficients in the bit stream, wherein when a portion of the bit stream is received, at least a first portion of bits representing the significant coefficients are decoded while at least a second portion of bits representing the less significant coefficients are ignored, depending on the required quality of the reconstructed frame.

30. The method of claim 21, wherein an inverse wavelet transform is performed on each reconstructed coefficient to generate a plurality of pixels representing an image of the frame.

* * * * *